(12) United States Patent
Kozakai et al.

(10) Patent No.: US 8,509,182 B2
(45) Date of Patent: Aug. 13, 2013

(54) HOME AGENT

(75) Inventors: Yasuyuki Kozakai, Kawasaki (JP);
Seijiro Yoneyama, Yokohama (JP);
Wakana Tsuchino, Tokyo (JP);
Masahiro Ishiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 376 days.

(21) Appl. No.: 12/546,901

(22) Filed: Aug. 25, 2009

(65) Prior Publication Data

US 2010/0046474 A1    Feb. 25, 2010

(30) Foreign Application Priority Data

Aug. 25, 2008 (JP) .................... 2008-215479

(51) Int. Cl.
*H04W 4/00* (2009.01)
(52) U.S. Cl.
USPC ............................ 370/331; 455/424
(58) Field of Classification Search
None
See application file for complete search history.

(56) References Cited

U.S. PATENT DOCUMENTS

| | | | | |
|---|---|---|---|---|
| 6,985,463 | B1 * | 1/2006 | Wright et al. | 370/331 |
| 2005/0020265 | A1 * | 1/2005 | Funabiki et al. | 455/436 |
| 2006/0120328 | A1 * | 6/2006 | Wright et al. | 370/331 |
| 2007/0254661 | A1 * | 11/2007 | Chowdhury et al. | 455/436 |
| 2008/0080427 | A1 * | 4/2008 | Suh et al. | 370/331 |
| 2010/0316018 | A1 * | 12/2010 | Turanyi et al. | 370/331 |

FOREIGN PATENT DOCUMENTS

JP    2005-244590    9/2005

* cited by examiner

*Primary Examiner* — Jianye Wu
(74) *Attorney, Agent, or Firm* — Oblon, Spivak, McClelland, Maier & Neustadt, L.L.P.

(57) ABSTRACT

When handover is performed from a first network to a second network, a home agent transmits a reply request message to a terminal through the first network after new configuration of a tunnel for transmitting and receiving a packet through the second network. If the home agent receives a reply message corresponding to the reply request message through the first network, the home agent detects that the configuration of the tunnel for transmitting and receiving the packet through the first network can be deleted, and deletes the configuration of the tunnel.

7 Claims, 11 Drawing Sheets

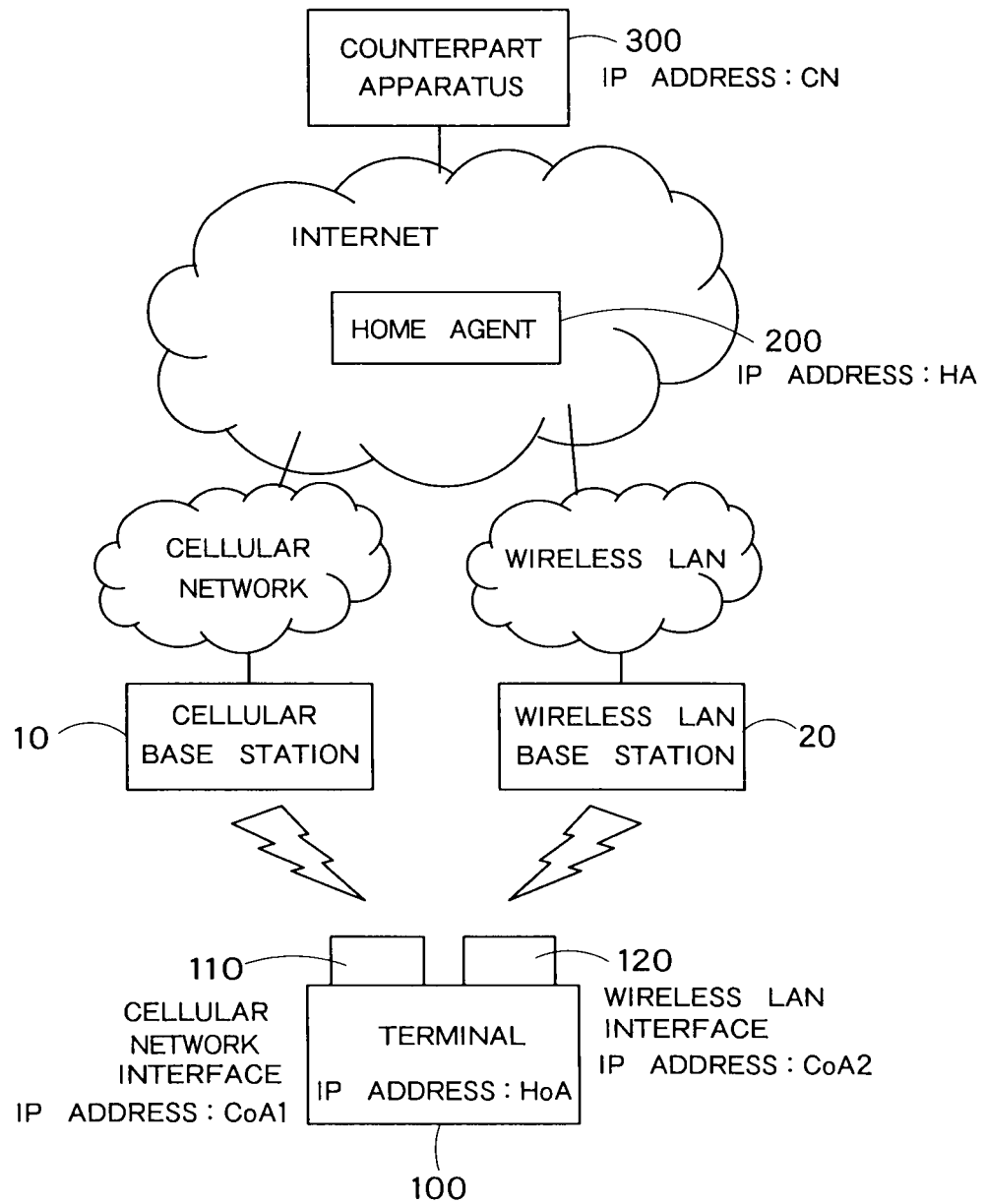
F I G. 1

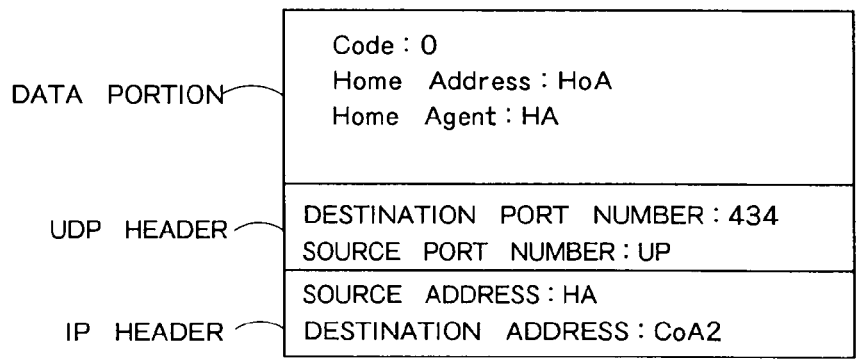
F I G. 7
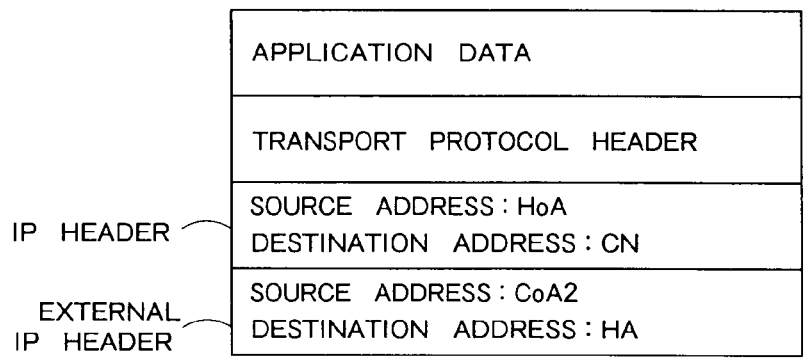
F I G. 8
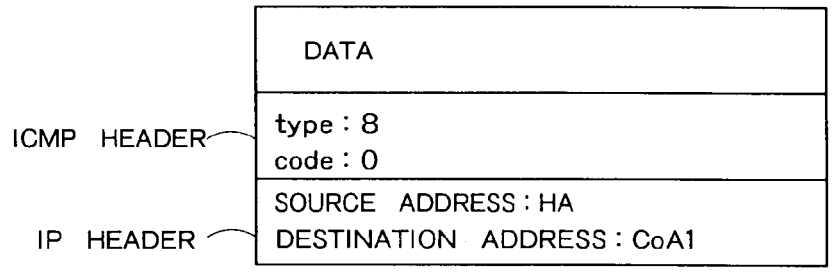
F I G. 9
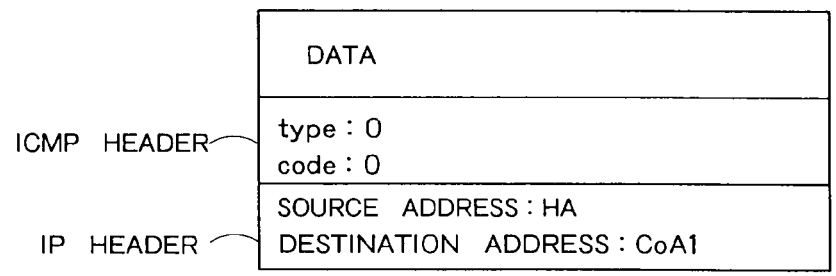
F I G. 10

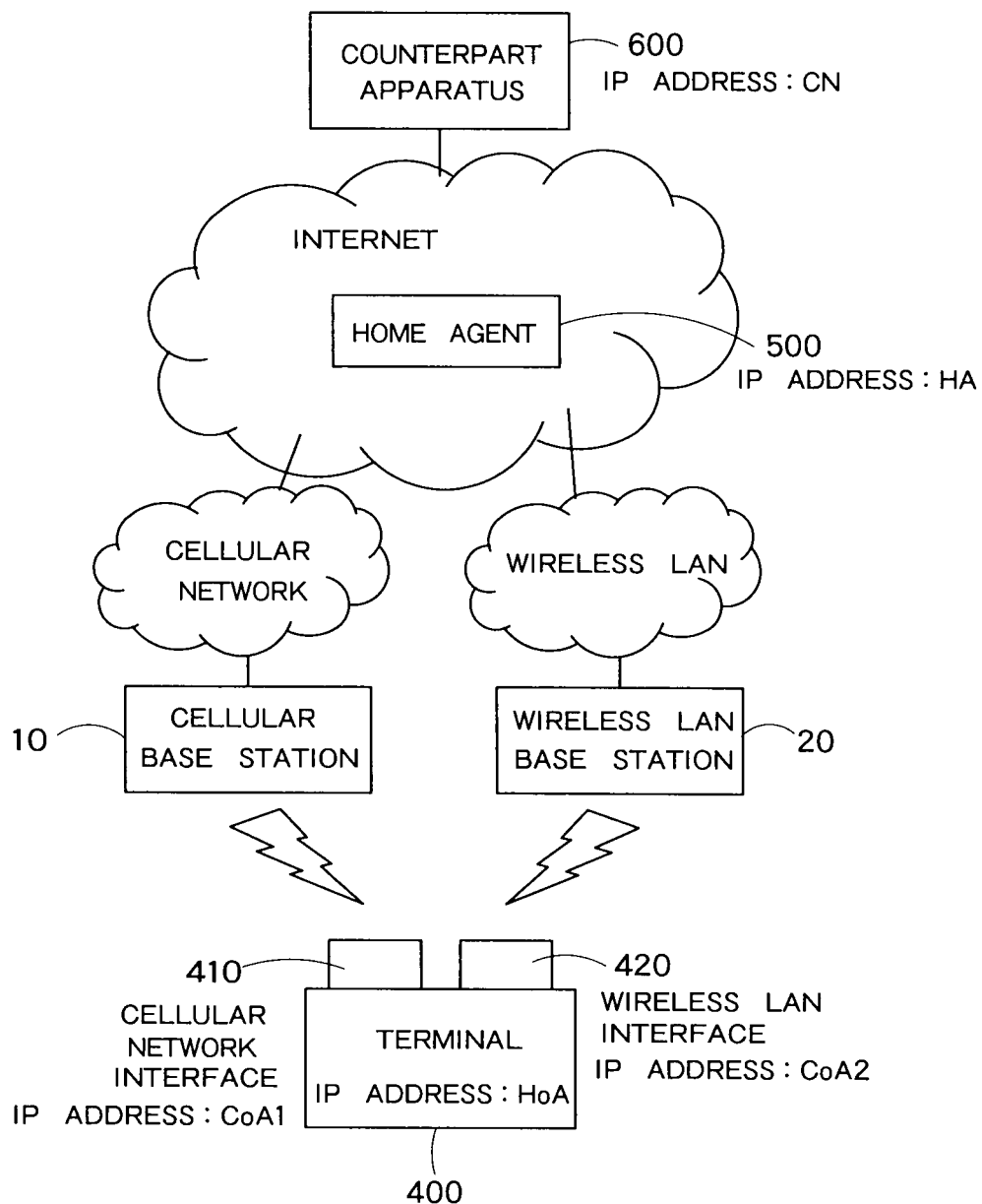
F I G. 11

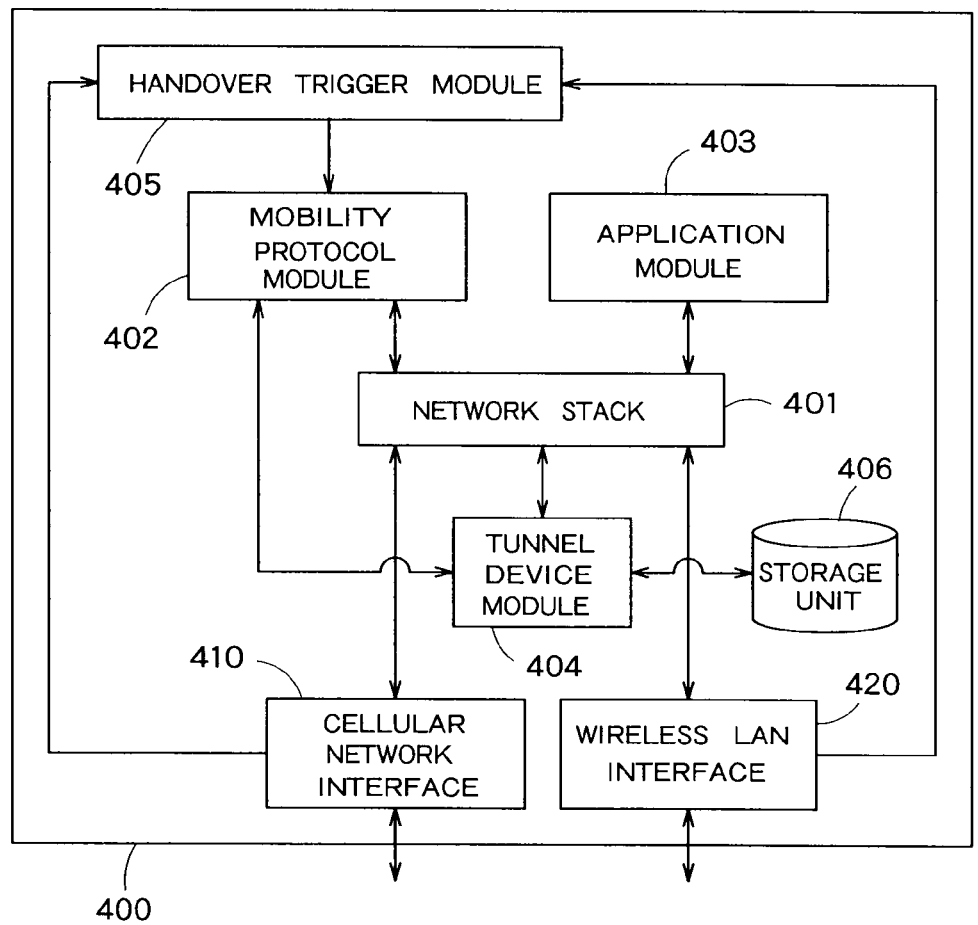
F I G. 12
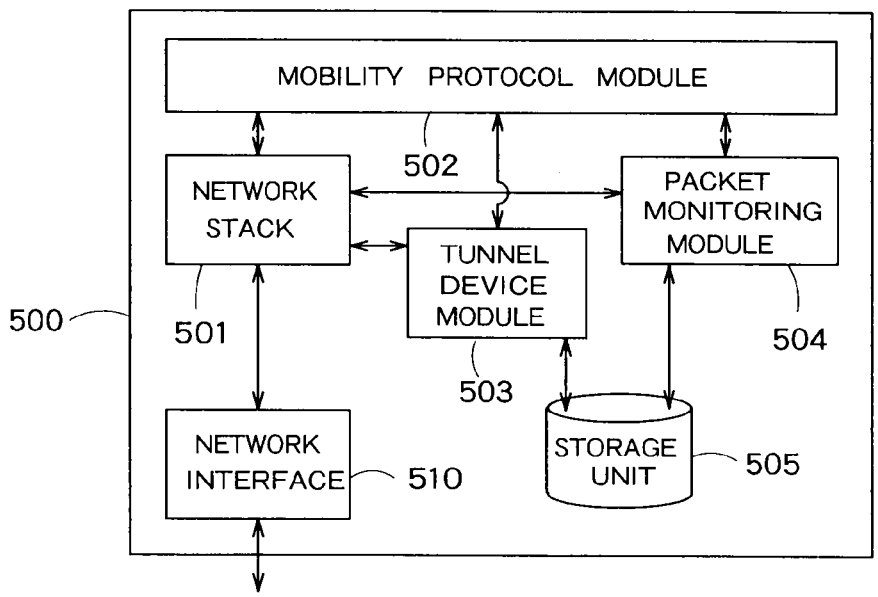
F I G. 13

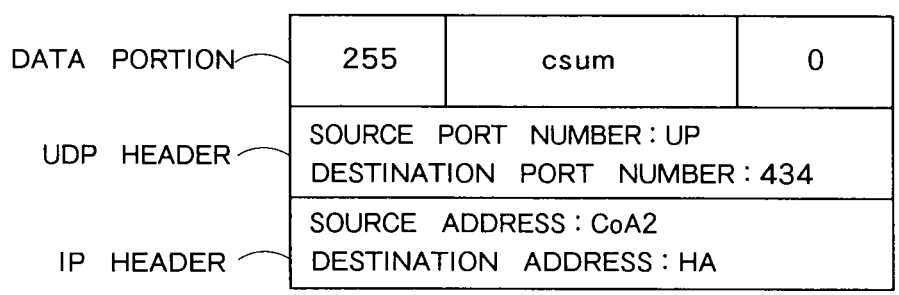
F I G. 15

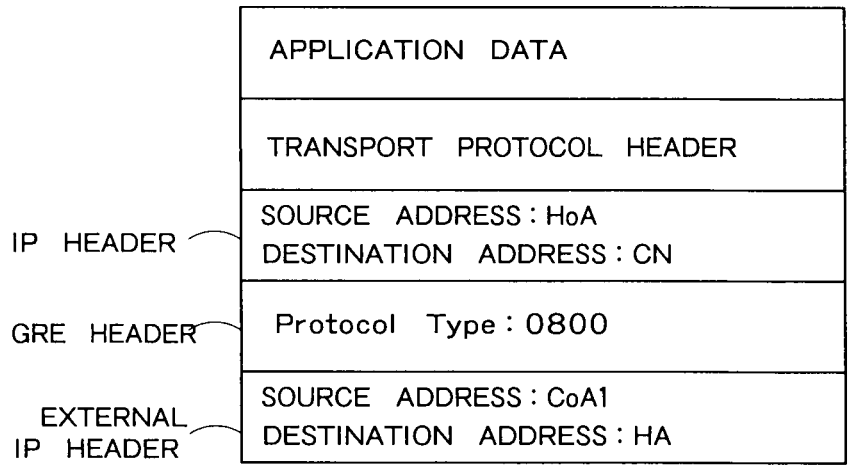
F I G. 17
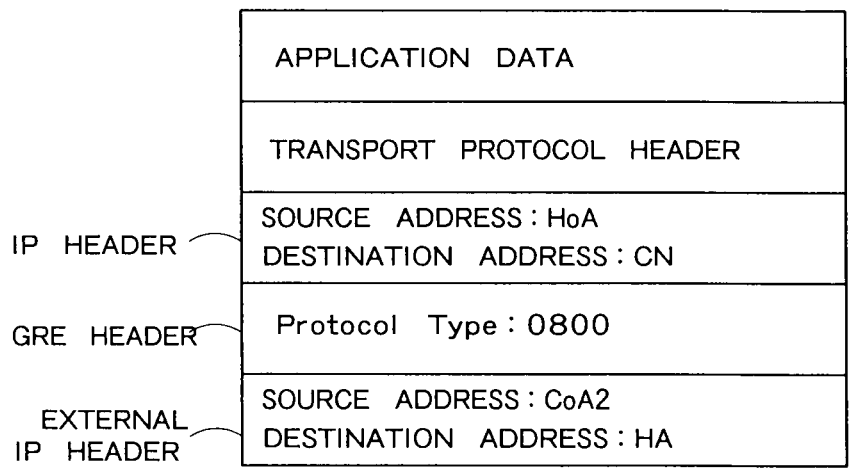
F I G. 18

HOME AGENT

CROSS REFERENCE TO RELATED APPLICATION

This application is based upon and claims benefit of priority from the Japanese Patent Application No. 2008-215479, filed on Aug. 25, 2008, the entire contents of which are incorporated herein by reference.

BACKGROUND OF THE INVENTION

1. Field of the Invention

The present invention relates to a home agent.

2. Related Art

A handover technique where a mobile terminal switches and uses a plurality of different networks, such as cellular system access networks like a PHS, a GPRS, a CDMA, and an HSDPA and an access network like 802.11 and 802.16, in accordance with a necessity has been known (refer to JP-A 2005-244590 (KOKAI)). The handover technique is generally called a vertical handover technique.

The vertical handover is realized using protocols, such as Mobile IPv4, Mobile IPv6, MOBIKE (IKEv2 Mobility and Multihoming) protocol. Further, it is known that the technique called soft handover reduces the number of packet losses when a terminal switches the network by these protocols.

Soft handover maintains the connection to the previous network for a while even after the terminal is connected to the new network, the terminal maintains a connection with the network before switching for a predetermined time. As a result, the terminal can securely receive all of the packets passing through the network used before switching, while network switching process.

Further, during the handover process, a relay apparatus (home agent) that provides mobility to the terminal also maintains a connection to the previous network after switching the network, for a while. As a result, the relay apparatus can securely receive all of the packets passing through the network before switching, during a network switching process and transmit the packets.

A soft handover method according to the related art at the time of vertical handover using Mobile IPv4 will be described. Hereinafter, the soft handover at the time of a vertical handover is simply referred to as handover. In this case, the case where a mobile terminal switches a used network from a cellular network to a wireless LAN will be described.

Before handover, a tunnel through a cellular network is established between a mobile terminal and a home agent. The home agent receives packets transmitted from a cellular network interface of the mobile terminal and transmits the packet to the counterpart apparatus.

The mobile terminal determines that it switches into a wireless LAN, when signal strength of an electric wave transmitted from a wireless LAN base station becomes sufficiently strong. In addition, a Registration Request message is transmitted from the wireless LAN interface of the mobile terminal to the home agent.

The home agent receives the Registration Request message and detects that the mobile terminal requires switching of the network. Then, the home agent transmits a Registration Reply message, the mobile terminal is allowed to switch network, to the wireless LAN interface of the mobile terminal.

The home agent configures a new tunnel such that the packet transmitted from the wireless LAN interface of the mobile terminal can be received, on receiving the Registration Request message or transmission of the Registration Reply message.

Further, if the mobile terminal receives the Registration Reply message, the mobile terminal configures a new tunnel so that the mobile terminal can transmit the packet from the wireless LAN interface to the home agent. Thereby, the mobile terminal can transmit the packet to the home agent by both of the wireless LAN interface and the cellular network interface.

In general, the communication delay of the cellular network is larger than the communication delay of the wireless LAN. For this reason, at a point of time when the packet is first received through the wireless LAN, the home agent does not receive the packet that is transmitted from the cellular network interface of the mobile terminal.

Even after establishing the new tunnel through the wireless LAN, the home agent holds configuration of the tunnel through the cellular network, and deletes the configuration of the tunnel after a sufficient time passes. Thereby, it is possible to receive all of the packets transmitted from the cellular network interface of the mobile terminal without causing a packet loss at the time of the handover.

However, in the handover method according to the related art, since the home agent cannot detect a point of time of receiving all of the packets transmitted from the cellular network (network before the handover) interface of the mobile terminal, the configuration of the tunnel is not deleted for some time after all of the packets are received, and a memory resource is wastefully used. Since the home agent establishes a tunnel with a plurality of terminals, it is strongly required to release the wasteful memory resource as early as possible and efficiently use the memory resource.

SUMMARY OF THE INVENTION

According to one aspect of the present invention, there is provided a home agent that transmits and receives data with a mobile terminal, which performs handover between a first network and a second network, the home agent comprising:

a network interface that transmits data to the mobile terminal and receives data from the mobile terminal, through the first network or the second network; and a mobility protocol module that receives a handover request message requesting to switch a used network from the first network to the second network from the network interface, generates a first reply message describing acceptance of the switching transmitted through the second network, provides the first reply message to the network interface, starts packet transmission and reception using the second network, generates a reply request message transmitted through the first network, provides the reply request message to the network interface, acquires a second reply message corresponding to the reply request message from the network interface, and stops utilization of the first network.

According to one aspect of the present invention, there is provided a home agent that transmits and receives data with a mobile terminal, which performs handover between a first network and a second network, the home agent comprising:

a network interface that transmits data to the mobile terminal and receives data from the mobile terminal, through the first network or the second network; and a mobility protocol module that receives a handover request message requesting to switch a used network from the first network to the second network from the network interface, generates a reply message describing acceptance of the switching transmitted through the second network, provides the reply message to the network interface, starts packet transmission and reception using the second network, receives a message where packet information is described from the network interface, and stops utilization of the first network in accordance with reception of a packet suitable for the packet information by the network interface.

According to one aspect of the present invention, there is provided a home agent that transmits and receives data with a mobile terminal, which performs handover between a first network and a second network, the home agent comprising:

a network interface that transmits data to the mobile terminal and receives a packet where a sequence number is described from the mobile terminal, through the first network or the second network;

a packet monitoring module that compares the sequence number described in the packet received by the network interface and a final sequence number and transmits a notification when the sequence number and the final sequence number are matched with each other; and a mobility protocol module that receives a handover request message requesting to switch a used network from the first network to the second network from the network interface, generates a reply message describing acceptance of the switching transmitted through the second network, provides the reply message to the network interface, starts packet transmission and reception using the second network, provides a value, which is obtained by subtracting 1 from a sequence number described in a packet that the network interface first receives through the second network, as the final sequence number to the packet monitoring module, and stops utilization of the first network on the basis of the notification from the packet monitoring module.

BRIEF DESCRIPTION OF THE DRAWINGS

FIG. 1 is a diagram illustrating the schematic configuration of a communication system according to a first embodiment;

FIG. 7 is a diagram illustrating an example of a Registration Reply message;

FIG. 8 is a diagram illustrating an example of the configuration of a packet that is transmitted from a terminal;

FIG. 9 is a diagram illustrating an example of an ICMP Echo Request message;

FIG. 10 is a diagram illustrating an example of an ICMP Echo Reply message;

FIG. 11 is a diagram illustrating the schematic configuration of a communication system according to a second embodiment;

FIG. 12 is a diagram illustrating the schematic configuration of a terminal according to the second embodiment;

FIG. 13 is a diagram illustrating the schematic configuration of a home agent according to the second embodiment;

FIG. 15 is a diagram illustrating an example of a notification message;

FIG. 17 is a diagram illustrating an example of the configuration of a packet that is transmitted from a terminal; and FIG. 18 is a diagram illustrating an example of the configuration of a packet that is transmitted from a terminal.

DETAILED DESCRIPTION OF THE EMBODIMENTS

Figure 2:
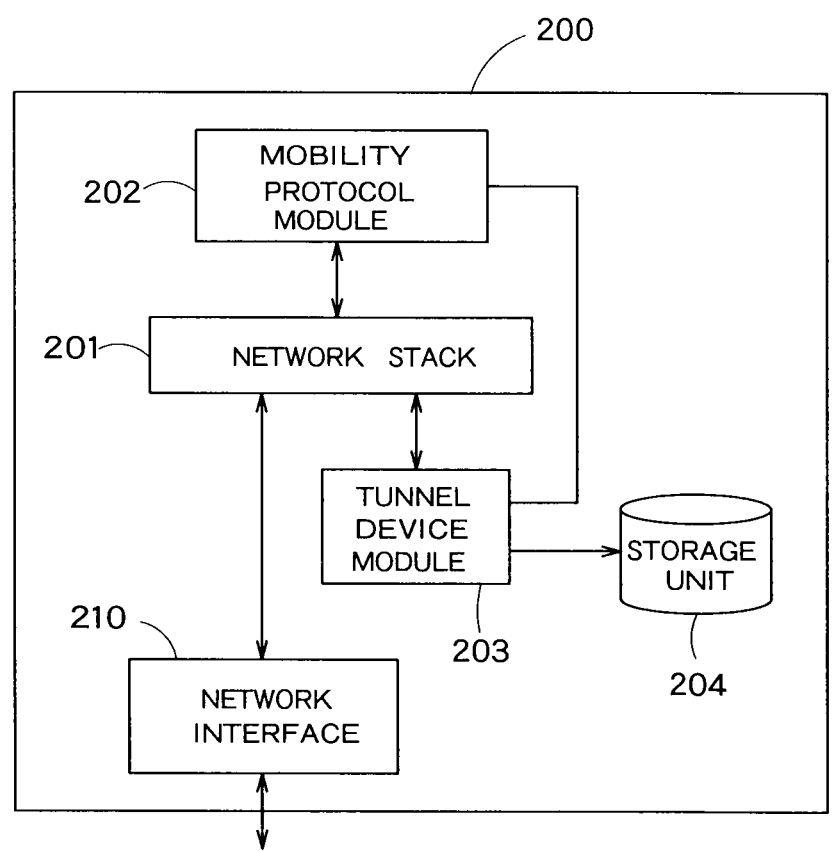
FIG. 2 is a diagram illustrating the schematic configuration of a home agent according to the first embodiment.

Hereinafter, exemplary embodiments of the present invention will be described with reference to the accompanying drawings.

First Embodiment

FIG. 1 shows the schematic configuration of a communication system according to a first embodiment of the present invention. A terminal 100 communicates with a counterpart apparatus 300 on the Internet. The terminal 100 includes a cellular network interface 110, and can be connected to a cellular network through a cellular base station 10. Further, the terminal 100 includes a wireless LAN interface 120, and can be connected to a wireless LAN through a wireless LAN base station 20.

A home agent 200 is an apparatus that provides a mobility function to the terminal 100. The home agent 200 uses an IP-in-IP tunneling protocol to establish a tunnel through a cellular network and/or the wireless LAN between the terminal 100 and the home agent 200, and uses the tunnel to relay a communication packet between the counterpart apparatus 300 and the terminal 100.

In this case, IP addresses that are allocated to the cellular network interface 110 of the terminal 100, the wireless LAN interface 120 thereof, the home agent 200, and the counterpart apparatus 300 are CoA1, CoA2, HA, and CN, respectively. Further, it is assumed that an IP address HoA is allocated to the terminal 100. The IP address HoA is selected such that all of packets where a destination address of an IP header that a router on the Internet analyzes to transmit the packets is HoA are received by the home agent 200.

FIG. 2 shows the schematic configuration of the home agent 200. The home agent 200 has a network stack 201, a mobility protocol module 202, a tunnel device module 203, a storage unit 204, and a network interface 210.

The network stack 201 processes a transport protocol, such as TCP, UDP, SCTP, DCCP, and ICMP, and a network protocol, such as IPv4 and IPv6. Further, the network stack 201 outputs to the tunnel device module 203 packets tunneled by IP-in-IP tunneling protocol that are received from the network interface 210.

Further, the network stack 201 outputs a tunneled packet, whose external IP header is deleted by the tunnel device module 203, to the network interface 210.

Further, the network stack 201 outputs contents of a Registration Request message, which is received from the network interface 210, to the mobility protocol module 202. Further, the network stack 201 adds a UDP header and an IP header to a Registration Reply message that is output from the mobility protocol module 202, and outputs the Registration Reply message to the network interface 210.

The Registration Request message and the Registration Reply message will be described in detail below.

Further, the network stack 201 adds an ICMP header and an IP header to an ICMP Echo Request message that is output from the mobility protocol module 202, and outputs the ICMP Echo Request message to the network interface 210.

Further, the network stack 201 outputs contents of an ICMP Echo Reply message, which is received from the network interface 210, to the mobility protocol module 202.

The ICMP Echo Request message and the ICMP Echo Reply message will be described in detail below.

The mobility protocol module 202 is a module that generates and processes a message of Mobile IPv4. Further, the mobility protocol module 202 receives the contents of the Registration Request message from the network stack 201 and processes the received contents. Further, the mobility protocol module 202 generates the Registration Reply message and outputs the Registration Reply message to the network stack 201.

Further, the mobility protocol module 202 notifies the tunnel device module 203 of the direction to configure a new tunnel or to delete the tunnel.

Further, the mobility protocol module 202 outputs the contents of the ICMP Echo Request message to the network stack 201 and acquires the contents of the ICMP Echo Reply message from the network stack 201.

The tunnel device module 203 stores the configuration of the tunnel, which is output from the mobility protocol module 202, in the storage unit 204.

When receiving a notification to delete the tunnel configuration from the mobility protocol module 202, the tunnel device module 203 deletes the corresponding tunnel configuration from the storage unit 204.

Further, the tunnel device module 203 inspects whether the tunneled packet received from the network stack 201 is in accordance with the tunnel configuration stored in the storage unit 204. If the packet is in accordance with the configuration of the tunnel, the tunnel device module 203 outputs the packet where an external IP header is deleted to the network stack 201, and if the packet is not in accordance with the configuration of the tunnel, the tunnel device module 203 discards the packet.

The storage unit 204 stores the configuration of the tunnel.

The network interface 210 is a network interface that supports a communication protocol, such as Ethernet. The network interface 210 outputs the received packet to the network stack 201.

Further, the network interface 210 transmits the packet, which is output from the network stack 201, to the counterpart apparatus 300 or the mobile terminal 100.

Figure 3:
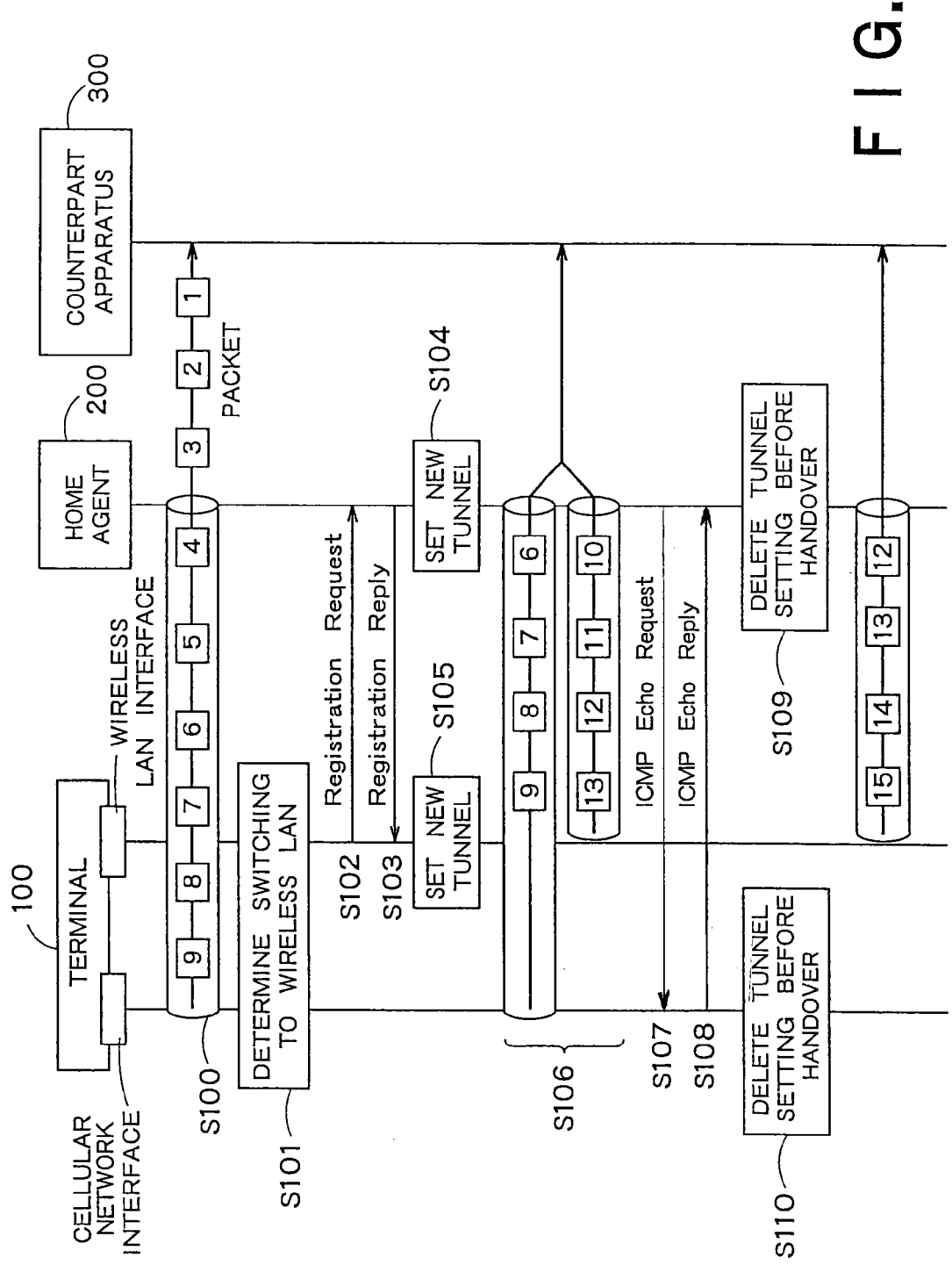
FIG. 3 is a diagram illustrating a process flow at the time of handover in the communication system according to the first embodiment.

The process flow at the time of handover in the communication system will be described using FIG. 3. In this embodiment, the case where the terminal 100 switches from the cellular network to the wireless LAN will be described.

(Step S100) The terminal 100 uses the tunnel through the cellular network that is established between the terminal 100 and the home agent 200 and transmits the packet to the home agent 200. The home agent 200 transmits the packet, which is received from the terminal 100, to the counterpart apparatus 300.

At this time, in the storage unit 204 of the home agent 200, a tuple of the IP address CoA1 of the cellular network interface 110 of the terminal 100, the IP address HoA of the terminal 100, and the IP address HA of the home agent 200 is stored as one tunnel configuration.

Figure 4:
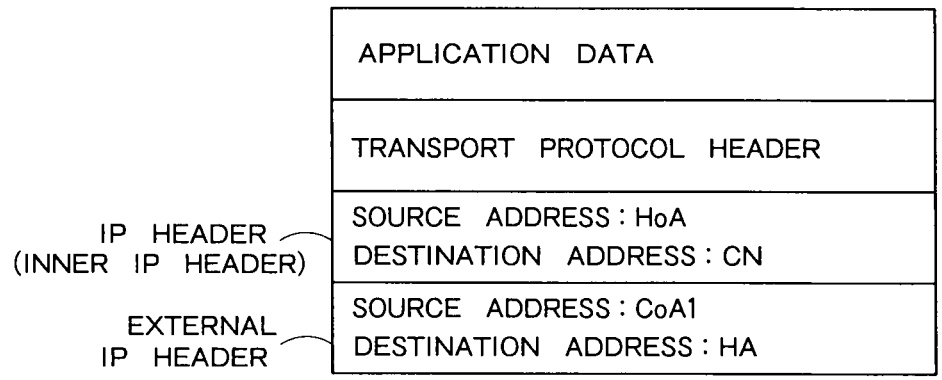
FIG. 4 is a diagram illustrating an example of the configuration of a packet that is transmitted from a terminal.

An example of the packet that is transmitted from the cellular network interface 110 of the terminal 100 to the home agent 200 is shown in FIG. 4. The packet is tunneled by an IP-in-IP tunneling protocol. In the packet, the source IP address of an external IP header is the IP address CoA1 of the cellular network interface 110 and the destination IP address of the external IP header is the IP address HA of the home agent 200.

If the network interface 210 of the home agent 200 receives the packet shown in FIG. 4, the network interface 210 outputs the packet to the network stack 201.

Since the received packet is tunneled by the IP-in-IP tunneling protocol, the network stack 201 outputs the packet to the tunnel device module 203.

The tunnel device module 203 acquires tunnel configuration including the IP address CoA1 from the storage unit 204. As described above, in the storage unit 204, the tuple of the IP address CoA1, HoA, and HA is stored as the tunnel configuration, and the tunnel device module 203 acquires the tuple.

Figure 5:
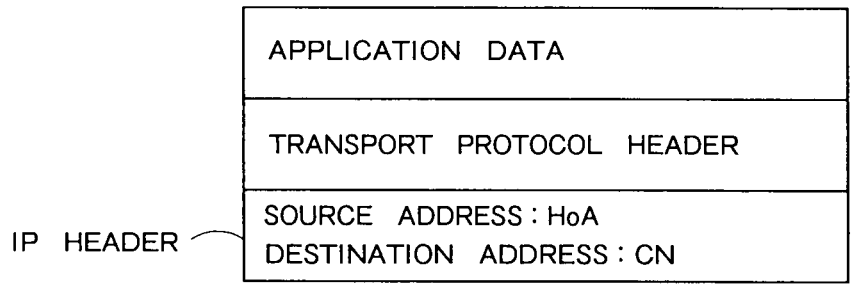
FIG. 5 is a diagram illustrating an example of the configuration of a packet that is transmitted from the home agent to a counterpart apparatus.

Next, the tunnel device module 203 compares the acquired IP address HoA with the source IP address of the internal IP header in the packet. As the comparison result, when the acquired IP address HoA and the source IP address are matched with each other, the tunnel device module 203 deletes the external IP header as shown in FIG. 5. In addition, the tunnel device module 203 outputs the packet to the network stack 201.

As the comparison result, if the acquired IP address HoA and the source IP address are not matched with each other, the tunnel device module 203 discards the packet.

Next, the network stack 201 that has received from the tunnel device module 203 the packet shown in FIG. 5 where the external IP header is deleted detects that the packet is to be transmitted to another apparatus (counterpart apparatus 300) because the destination IP address of the received packet is not the IP address HA allocated to the home agent 200, and outputs the packet to the network interface 210.

The network interface 210 transmits the packet, which is received from the network stack 201, to the counterpart apparatus 300.

(Step S101) The terminal 100 determines to switch from the cellular network to the wireless LAN. For example, the terminal 100 detects that signal strength of an electric wave transmitted from the wireless LAN base station 20 becomes sufficiently strong, and determines switching to the wireless LAN.

(Step S102) The Registration Request message is transmitted from the wireless LAN interface 120 of the terminal 100 to the home agent 200.

Figure 6:
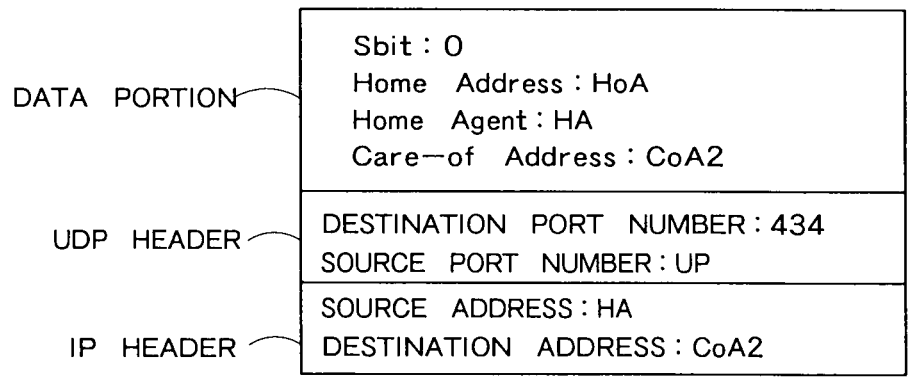
FIG. 6 is a diagram illustrating an example of a Registration Request message.

An example of the Registration Request message is shown in FIG. 6. The Registration Request message includes an IP header, a UDP header, and a data portion.

The source IP address in the IP header is the IP address CoA2 that is allocated to the wireless LAN interface 120 of the terminal 100, and the destination IP address is the IP address HA of the home agent.

Further, the destination port number in the UDP header is 434. Further, in the data portion of the Registration Request message, the value of Sbit is 0, the value of Home Address field is the IP address HoA, the value of Home agent field is the IP address HA of the home agent 200, and the value of Care-of Address field is CoA2 allocated to the wireless LAN interface 120 of the terminal 100.

In the first embodiment, it is assumed that the source UDP port number of the Registration Request message is UP.

If the network interface 210 of the home agent 200 receives the Registration Request message, the network interface 210 outputs the Registration Request message to the network stack 201.

Since the transport protocol header of the Registration Request message is UDP and the destination port number is 434, the network stack 201 detects that the destination of the Registration Request message is the mobility protocol module 202, and outputs the Registration Request message to the mobility protocol module 202.

The mobility protocol module 202 inspects the contents of the Registration Request message that is received from the network stack 201.

(Step S103) If the home agent 200 accepts the request with the Registration Request message, the home agent 200 transmits the Registration Reply message to the wireless LAN interface 120 of the terminal 100.

The mobility protocol module 202 generates a data portion of the Registration Reply message and outputs it to the network stack 201. In this case, the mobility protocol module 202 set 0 to Code field of the Registration Reply message, the IP address HoA of the terminal 100 to the Home Address field, and the IP address Ha of the home agent 200 to the Home Agent field.

The network stack 201 adds, to the data portion of the Registration Reply message received from the mobility protocol module 202, a UDP header where the source port number is 434 and the destination port number is UP and an IP header where the destination IP address is the IP address CoA2 of the wireless LAN interface 120 of the terminal 100 and the source IP address is the IP address HA of the home agent 200. The network stack 201 generates a Registration Reply message shown in FIG. 7.

The network stack 201 outputs the generated Registration Reply message to the network interface 210. The network interface 210 transmits the Registration Reply message, which is received from the network stack 201, to the wireless LAN interface 120 of the terminal 100.

(Step S104) The home agent 200 configures a new tunnel so that the home agent 200 can receive the packet transmitted from the wireless LAN interface 120 of the terminal 100.

The mobility protocol module 202 of the home agent 200 outputs a tuple of CoA2 which is the IP address of the wireless LAN interface 120 on the terminal 100 and is the IP address in the Care-of Address field in the Registration Request message, HoA which is the IP address of the Home Address field, and HA which is the IP address in the Home Agent field, as new tunnel configuration to the tunnel device module 203.

The tunnel device module 203 stores the new tunnel configuration, which is received from the mobility protocol module 202, in the storage unit 204.

However, the home agent 200 may configure the new tunnel before Step S103.

The home agent 200 holds the configuration of the tunnel that is used to receive the packet transmitted from the cellular network interface 110 of the terminal 100 before the new tunnel is configured, without deleting the configuration of the tunnel.

(Step S105) If the Registration Reply message that is transmitted from the home agent 200 is received by the wireless LAN interface 120, the terminal 100 configures a new tunnel for transmitting the packet from the wireless LAN interface 120 to the home agent 200.

Further, the terminal 100 holds the configuration of the tunnel that is used before Step S105 and is needed to transmit the packet from the cellular network interface 110 to the home agent 200, without deleting the configuration of the tunnel.

(Step S106) The terminal 100 transmits a packet from the wireless LAN interface 120 but does not transmit a packet from the cellular network interface 110.

An example of the packet that is transmitted from the wireless LAN interface 120 is shown in FIG. 8.

In the packet, the source IP address of the external IP header is the IP address CoA2 of the wireless LAN interface 120.

The home agent 200 that has received the packet from the wireless LAN interface 120 deletes the external IP header of the packet and transmits the packet to the counterpart apparatus 300. Specifically, the following processes are executed.

First, the network interface 210 receives the packet that is transmitted from the wireless LAN interface 120. The network interface 210 outputs the received packet to the network stack 201.

Since the received packet is tunneled by the IP-in-IP tunneling protocol, the network stack 201 outputs the packet to the tunnel device module 203.

The tunnel device module 203 acquires tunnel configuration including the source IP address CoA2 in the external IP header of the packet from the storage unit 204.

As described above, in the storage unit 204, the tuple of the IP address CoA2, HoA, and HA is stored as the tunnel configuration in Step S104, then the tunnel device module 203 acquires the tuple.

In addition, the tunnel device module 203 compares the acquired IP address HoA with the source IP address in the internal IP header in the packet. As the comparison result, if the acquired IP address HoA and the source IP address are matched with each other, the tunnel device module 203 deletes the external IP header and outputs the packet to the network stack 201. Meanwhile, as the comparison result, if the acquired IP address HoA and the source IP address are not matched with each other, the tunnel device module 203 discards the packet.

Next, the network stack 201 detects that the packet is to be transmitted to another apparatus because the destination IP address of the packet received from the tunnel device module 203 is not the IP address HA allocated to the home agent 200, then outputs the packet to the network interface 210.

The network interface 210 transmits the packet, which is received from the network stack 201, to the counterpart apparatus 300.

(Step S107) The home agent 200 transmits an ICMP Echo Request message (reply request message) to the cellular network interface 110 of the terminal 100. Specifically, the home agent 200 executes the following processes.

First, the mobility protocol module 202 generates data of the ICMP Echo Request message and outputs the data to the network stack 201.

Next, the network stack 201 adds an ICMP header and an IP header to the received data, and generates an ICMP Echo Request message shown in FIG. 9. The network stack 201 sets 8 to an ICMP type of the ICMP header and 0 to an ICMP code.

Further, the network stack 201 sets the IP address HA of the home agent 200 to the source IP address of the IP header and the IP address CoA1 of the cellular network interface 110 of the terminal 100 to the destination IP address.

The network stack 201 outputs the generated ICMP Echo Request message to the network interface 210. The network interface 210 transmits the ICMP Echo Request message to the cellular network interface 110 of the terminal 100.

Further, the above process is executed immediately after the process of Step S104.

(Step S108) If the terminal 100 receives the ICMP Echo Request message, the terminal 100 generates an ICMP Echo Reply message shown in FIG. 10, and transmits the ICMP Echo Reply message from the cellular network interface 110 to the home agent 200.

The ICMP Echo Reply message is transmitted from the cellular network interface 110 to the home agent 200, after Step S105. That is, the time when ICMP Echo Reply message is transmitted from the cellular network interface 110 to the home agent 200 is later than the time when the final packet is transmitted from the cellular network interface 110 to the home agent 200 before Step S105.

Accordingly, the home agent 200 can detect that the packet transmitted from the cellular network interface 110 of the terminal 100 is not received, after receiving the ICMP Echo Reply message.

(Step S109) The home agent deletes the configuration of the tunnel that is used to receive the packet transmitted from the cellular network interface 110 of the terminal 100, in accordance with the reception of the ICMP Echo Reply message. Specifically, the following processes are executed.

If the network interface 210 receives the ICMP Echo Reply message, the network interface 210 outputs the ICMP Echo Reply message to the network stack 201.

Next, the network stack 201 outputs the contents of the ICMP Echo Reply message to the mobility protocol module 202.

The mobility protocol module 202 inspects whether the data portion of the ICMP Echo Reply message is matched with the data portion of the ICMP Echo Request message. If the data portions are not matched with each other, the mobility protocol module 202 discards the ICMP Echo Reply message.

Meanwhile, if the data portions are matched with each other, the mobility protocol module 202 notifies the tunnel device module 203 so as to delete the configuration of the tunnel that includes CoA1 which is the source IP address in the ICMP Echo Reply message.

The tunnel device module 203 deletes from the storage unit 204 the configuration of the tunnel including the notified IP address CoA1. In the storage unit 204, the tuple of the IP address CoA1, HoA, and HA is stored as the tunnel configuration. Then the tuple is deleted from the storage unit 204.

As a result, even though the home agent 200 receives from an apparatus other than the terminal 100 a false packet where the source IP address of an external IP header is CoA1 and the source IP address of an internal IP header is HoA, the home agent 200 can discard the false packet.

(Step S110) The terminal 100 deletes the configuration of the tunnel that is used to transmit the packet from the cellular network interface 110 to the home agent 200 before the handover. This process is executed after transmitting the ICMP Echo Reply message in Step S108.

The home agent 200 transmits a message, which can be replied by the terminal 100, to the terminal 100 through the network used before the handover immediately after the handover process, and detects the point of time when the home agent receives a reply message from the terminal as the point of time when the tunnel used before the handover can be deleted.

For this reason, even though the terminal 100 does not have a function of transmitting a special message to the home agent 200, the home agent 200 can detect the point of time when the home agent completely received all of the packets from the terminal 100 through the tunnel used before the handover and the tunnel can be deleted.

As a result, since it is possible to quickly delete the tunnel used before the handover, a memory resource can be effectively used.

Further, the home agent 200 according to this embodiment may transmit various messages that can be replied from the cellular network interface 110 by the terminal 100, instead of the ICMP Echo Request message.

In this embodiment, the terminal 100 and the home agent 200 uses Mobile IPv4 as a mobility protocol, but may use Mobile IPv6 instead of the Mobile IPv4. In the case that the terminal 100 and the home agent 200 use the Mobile IPv6, the home agent 200 transmits an ICMPv6 Echo Request message instead of the ICMP Echo Request message to the cellular network interface 110 of the terminal 100.

Further, the terminal 100 and the home agent 200 may use a GRE tunnel or any one of the other tunneling protocols, instead of the IP-in-IP tunneling protocol.

Second Embodiment

FIG. 11 shows the schematic configuration of a communication system according to a second embodiment of the present invention. A terminal 400 communicates with a counterpart apparatus 600 on the Internet. The terminal 400 includes a cellular network interface 410, and can be connected to a cellular network through a cellular base station 10. Further, the terminal 400 includes a wireless LAN interface 420, and can be connected to a wireless LAN through a wireless LAN base station 20.

A home agent 500 is an apparatus that provides a mobility function to the terminal 400. The home agent 500 uses an IP-in-IP tunneling protocol to establish a tunnel through a cellular network and/or the wireless LAN between the terminal 400 and the home agent 500, and uses the tunnel to relay packets between the counterpart apparatus 600 and the terminal 400.

Similar to the first embodiment, IP addresses that are allocated to the cellular network interface 410 of the terminal 400, the wireless LAN interface 420 thereof, the home agent 500, and the counterpart apparatus 600 are CoA1, CoA2, HA, and CN, respectively. Further, it is assumed that an IP address HoA is allocated to the terminal 400.

FIG. 12 shows the schematic configuration of the terminal 400. The terminal 400 has a network stack 401, a mobility protocol module 402, an application module 403, a tunnel device module 404, a handover trigger module 405, a storage unit 406, a cellular network interface 410, and a wireless LAN interface 420.

The cellular network interface 410 is a network interface that supports a cellular system communication protocol, such as CDMA, HSDPA or PHS. The cellular network interface 410 outputs the received packet to the network stack 401. Further, the cellular network interface 410 transmits the packet that is received from the network stack 401.

The wireless LAN interface 420 is a network interface that supports an 802.11 system protocol, such as 802.11b, 802.11g, 802.11a, and 802.11n, and outputs the received packet to the network stack. Further, the wireless LAN interface 420 transmits data that is received from the network stack 401.

The network stack 401 processes a transport protocol, such as TCP, UDP, SCTP, DCCP, and ICMP, and a network protocol, such as IPv4 and IPv6. The network stack 401 adds a transport header and an IP header to application data that is received from the application module 403, and outputs the application data to the tunnel device module 404.

Further, the network stack 401 outputs a packet, which is received from the tunnel device module 404 and tunneled by an IP-in-IP tunneling protocol, to the cellular network interface 410 or the wireless LAN interface 420.

Further, the network stack 401 outputs contents of a Registration Reply message, which is received by the cellular network interface 410 or the wireless LAN interface 420, to the mobility protocol module 402.

Further, the network stack 401 adds a UDP header and an IP header to the Registration Request message output from the mobility protocol module 402, and outputs the Registration Request message to the cellular network interface 410 or the wireless LAN interface 420.

The mobility protocol module 402 is a module that generates and processes a message of Mobile IPv4. The mobility protocol module 402 generates the Registration Request message and outputs the Registration Request message to the network stack 401. Further, the mobility protocol module 402 receives the Registration Reply message from the network stack 401 and processes the received Registration Reply message.

Further, the mobility protocol module 402 uses the configuration of the tunnel used before the handover to acquire contents of a final packet generated by the tunnel device module 404 from the tunnel device module 404.

Further, the mobility protocol module 402 generates a notification message indicating a characteristic of the packet (final packet generated by the tunnel device module 404) and outputs the notification message to the network stack 401.

Further, the mobility protocol module 402 notifies the tunnel device module 404 of the direction to configure a new tunnel or to delete the tunnel.

The application module 403 generates application data and outputs the application data to the network stack 401.

The tunnel device module 404 adds an IP header to the packet that is received from the network stack 401, and outputs the packet to the network stack 401. Further, the tunnel device module 403 stores the final packet, to which an IP header is added and which is output to the network stack 401, in the storage unit 406.

The tunnel device module 404 deletes the packet which has the same source IP address and the same destination IP address from the storage unit 406.

Further, the tunnel device module 404 outputs the packets, which are stored in the storage unit 406, to the mobility protocol module 402.

Further, the tunnel device module 404 stores the configuration of the tunnel notified from the mobility protocol module 402 in the storage unit 406, and deletes the configuration of the tunnel notified from the mobility protocol module 402 from the storage unit 406.

The handover trigger module 405 determines the point of time to start the handover. For example, the handover trigger module 405 acquires from the cellular network interface 410 or the wireless LAN interface 420 information related to a communication quality in the cellular network or the wireless LAN, determines the point of time to start the handover on the basis of the information or the other information, and notifies the mobility protocol module 402 of the point of time.

The storage unit 406 stores configuration of the tunnel. Further, the storage unit 406 stores contents of the final packet that is generated by the tunnel device module 404.

FIG. 13 shows the schematic configuration of the home agent 500. The home agent 500 has a network stack 501, a mobility protocol module 502, a tunnel device module 503, a packet monitoring module 504, a storage unit 505, and a network interface 510.

The network interface 510 supports a communication protocol, such as Ethernet. The network interface 510 outputs the received packet to the network stack 501. Further, the network interface 510 transmits the packet, which is received from the network stack 501, to the terminal 400 or the counterpart apparatus 600.

The network stack 501 processes a transport protocol, such as TCP, UDP, SCTP, DCCP, and ICMP, and a network protocol, such as IPv4 and IPv6.

Further, the network stack 501 outputs a packet, which is received from the network interface 510, to the packet monitoring module 504.

Further, the network stack 501 outputs to the tunnel device module 503 a tunneled packet among packets that are received from the packet monitoring module 504.

Further, the network stack 501 outputs a packet, whose external IP header is deleted, to the network interface 510.

Further, the network stack 501 outputs contents of a Registration Request message, which is received from the network interface 510, to the mobility protocol module 502.

Further, the network stack 501 adds a UDP header and an IP header to a Registration Reply message that is output from the mobility protocol module 502, and outputs the Registration Reply message to the network interface 510.

Further, the network stack 501 outputs contents of a notification message, which is received from the network interface 510, to the mobility protocol module 502.

The mobility protocol module 502 is a module that generates and processes a message of Mobile IPv4. Further, the mobility protocol module 502 receives the Registration Request message from the network stack 501 and processes the Registration Request message. Further, the mobility protocol module 502 generates the Registration Reply message and outputs the Registration Reply message to the network stack 501.

Further, the mobility protocol module 502 notifies the tunnel device module 503 of the direction to configure a new tunnel or to delete the tunnel.

Further, the mobility protocol module 502 receives the notification message from the network stack 501, notifies the packet monitoring module 504 of a characteristic of the packet described in the notification message, and receives from the packet monitoring module 504 a notification indicating that the packet corresponding to the characteristic is detected.

The tunnel device module 503 stores the configuration of the tunnel, which is received from the mobility protocol module 502, in the storage unit 505.

When receiving a direction to delete the tunnel configuration from the mobility protocol module 502, the tunnel device module 503 deletes the corresponding tunnel configuration from the storage unit 505.

Further, the tunnel device module 503 inspects whether the tunneled packet received from the network stack 501 is in accordance with the tunnel configuration stored in the storage unit 505. When the packet is in accordance with the configuration of the tunnel, the tunnel device module 503 outputs the packet where an external IP header is deleted to the network stack 501.

The packet monitoring module 504 stores data, which indicates the characteristic of the packet received from the mobility protocol module 502, in the storage unit 505.

Further, the packet monitoring module 504 determines whether the packet received from the network stack 501 matches the characteristic of the packet stored in the storage unit 505, notifies the mobility protocol module 502 of the packet corresponding to the characteristic if the packet matches the characteristic, and outputs the packet to the network stack 501, after the determination.

The packet monitoring module 504 may be embedded in the tunnel device module 503.

The storage unit 505 stores the configuration of the tunnel. Further, the storage unit 505 stores the data that indicates the characteristic of the packet, which is output from the packet monitoring module 504.

Figure 14:
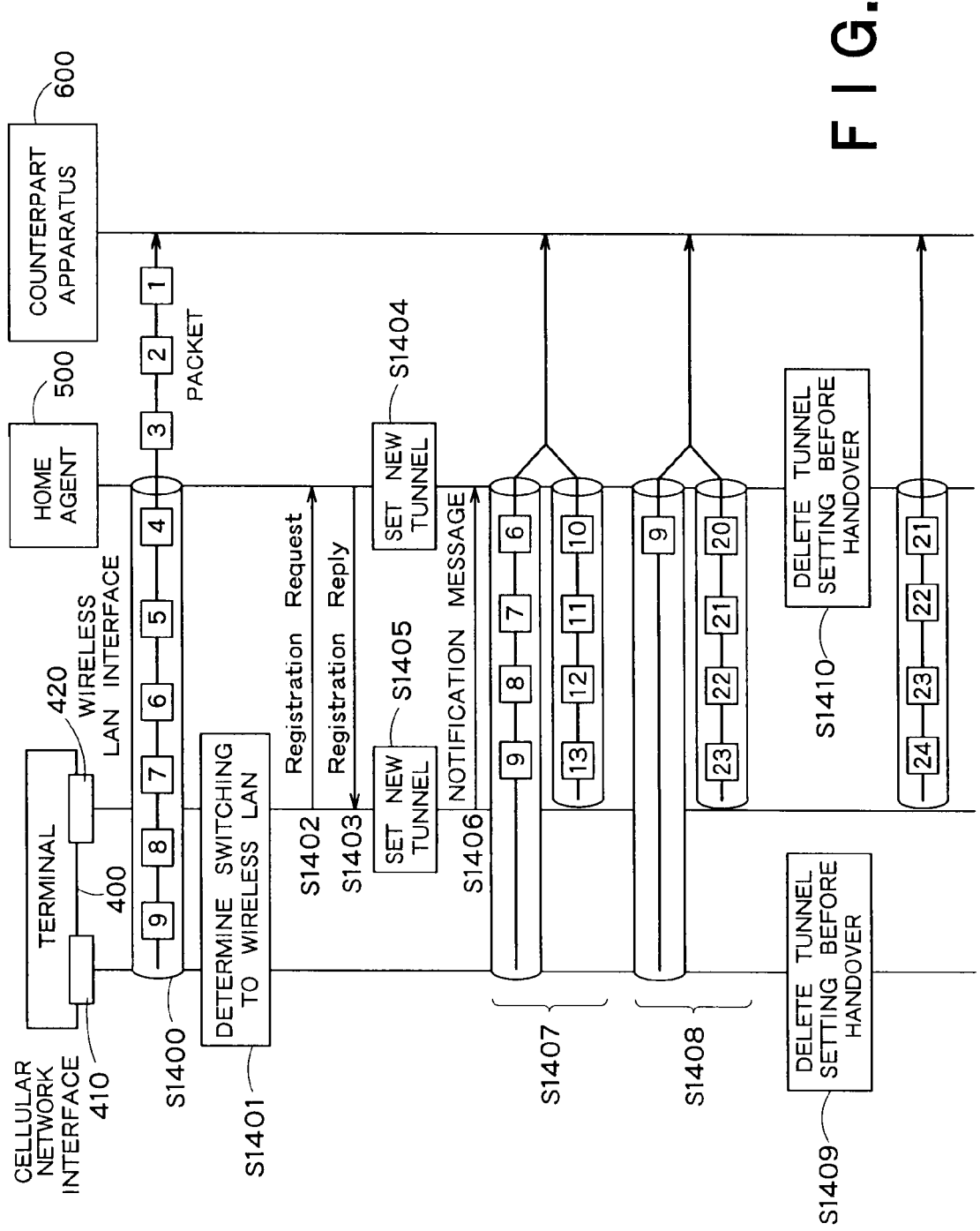
FIG. 14 is a diagram illustrating a process flow at the time of handover in the communication system according to the second embodiment.

The process flow at the time of handover in the communication system will be described using FIG. 14. In this embodiment, the case where the terminal 400 switches from the cellular network to the wireless LAN will be described.

(Step S1400) The terminal 400 and the home agent 500 communicate with each other by a tunnel through the cellular network, and the terminal 400 transmits the packet to the counterpart apparatus 600 through the home agent 500.

Specifically, in the terminal 400, the following processes are executed. In this case, in the storage unit 406 of the terminal 400, a tuple of the IP address CoA1 allocated to the cellular network interface 410 and the IP address HA of the home agent 500 is stored as one tunnel configuration.

The application module 403 generates transmission data and outputs the transmission data to the network stack 401.

The network stack 401 adds a transport header and an IP header to the transmission data that is received from the application module 403, and outputs the transmission data to the tunnel device module 404.

The tunnel device module 404 adds an external IP header to the packet that is received from the network stack 401, and generates the packet shown in FIG. 4. The tunnel device module 404 stores contents of the generated packet in the storage unit 406.

In addition, the tunnel device module 404 deletes the contents of the packet that is stored in the storage unit 406 before Step S1400 and has the same source IP address and the same destination IP address of an external IP header of the packet.

Subsequently, the tunnel device module 404 outputs the generated packet to the network stack 401.

The network stack 401 outputs the tunneled packet, which is received from the tunnel device module 404, to the cellular network interface 410. The cellular network interface 410 transmits the packet, which is transmitted from the network stack 401, to the home agent 500.

Specifically, in the home agent 500, the following processes are executed. In this case, in the storage unit 505 of the home agent 500, a tuple of the IP address CoA1 allocated to the cellular network interface 410 of the terminal 400, the IP address HoA of the terminal 400, and the IP address HA of the home agent 500 is stored as one tunnel configuration.

If the network interface 510 receives from the terminal 400 a packet that is tunneled by the IP-in-IP tunneling protocol, which is shown in FIG. 4, the network interface 510 outputs the received packet to the network stack 501.

The network stack 501 outputs the packet, which is received from the network interface 510, to the packet monitoring module 504.

The packet monitoring module 504 acquires data indicating a characteristic of the packet from the storage unit 505, and determines whether the packet received from the network stack 501 corresponds to the acquired data. In Step S1400, since data indicating characteristics of packets is not stored in the storage unit 505, the packet monitoring module 504 determines that the packet does not match the acquired data.

If it is determined that the packet does not correspond to the acquired data, the packet monitoring module 504 outputs the packet to the network stack 501. Further, a process of when it is determined that the packet corresponds to the acquired data will be described in Step S1508.

Since the packet that is received from the packet monitoring module 504 is the packet that is tunneled by the IP-in-IP tunneling protocol, the network stack 501 outputs the packet to the tunnel device module 503.

The tunnel device module 503 acquires tunnel configuration including the IP address CoA1, which is the source IP address of the external IP header, from the storage unit 505. As described above, since the tuple of the IP address CoA1, HoA, and HA is stored as the tunnel configuration in the storage unit, the tunnel device module 503 acquires the tuple.

Next, the tunnel device module 503 compares the acquired IP address HoA with the source IP address of the internal IP header in the packet. As the comparison result, if the acquired IP address and the source IP address are matched with each other, the tunnel device module 503 deletes the external IP header of the packet and generates the packet shown in FIG. 5. In addition, the tunnel device module 503 outputs the generated packet to the network stack 501. Meanwhile, as the comparison result, if the acquired IP address and the source IP address are not matched with each other, the tunnel device module 503 discards the packet.

Next, the network stack 501 that has received the packet from the tunnel device module 503 detects that the packet is a packet to be transmitted to another apparatus because the destination IP address of the received packet is not the IP address HA allocated to the home agent 500, and outputs the packet to the network interface 510.

The network interface 510 transmits the packet, which is received from the network stack 501, to the communication counterpart apparatus 600.

(Step S1401) The terminal 400 determines to switch from the cellular network to the wireless LAN.

The handover trigger module 405 of the terminal 400 always acquires, from the cellular network interface 410 and/or the wireless LAN interface 420, information related to a communication quality in the cellular network or the wireless LAN.

In addition, if the information or the other information satisfies a predetermined condition, the handover trigger module 405 determines to start the handover, and notifies the mobility protocol module 402 of the determination.

Further, an algorithm that is used when the handover trigger module 405 determines to start the handover is not limited. As an example, there is a method in which a terminal starts handover when strength of an electric wave received from the wireless LAN base station 20 becoming sufficiently strong.

(Step S1402) The terminal 400 transmits the Registration Request message to the home agent 500.

Specifically, the terminal 400 executes the following processes. The mobility protocol module 402 of the terminal 400 generates a data portion of the Registration Request message.

The mobility protocol module 402 outputs the data portion of the generated Registration Request message to the network stack 401.

The network stack 401 adds, to the data portion of the Registration Request message received from the mobility protocol module 402, a UDP header where a destination port number is 434 and an IP header where a destination IP address is an IP address HA of the home agent 500 and a source IP address is the IP address CoA2 of the wireless LAN interface 420 of the terminal 400. Further, the network stack sets UP to the source port number in the UDP header.

As a result, the same Registration Request message as that in the first embodiment shown in FIG. 6 is generated.

The network stack 401 outputs the Registration Request message to the wireless LAN interface 420. The wireless LAN interface 420 transmits the Registration Request message, which is received from the network stack 401, to the home agent 500.

If the Registration Request message that is transmitted from the terminal 400 is received by the home agent 500, the home agent 500 executes the following processes.

The network interface 510 of the home agent 500 receives the Registration Request message and outputs the Registration Request message to the network stack 501.

Since the transport protocol header of the Registration Request message is UDP and the destination port number is 434, the network stack 501 detects that the destination of the Registration Request message is the mobility protocol module 502, and outputs the Registration Request message to the mobility protocol module 502.

The mobility protocol module 502 inspects the contents of the Registration Request message that is received from the network stack 501.

(Step S1403) if the home agent 500 accepts the request with the Registration Request message, the home agent 500 transmits the Registration Reply message to the wireless LAN interface 420.

Specifically, the home agent 500 executes the following processes. First, the mobility protocol module 502 of the home agent 500 generates a data portion of the Registration Reply message and outputs it to the network stack 501.

The network stack 501 adds, to the data portion of the Registration Reply message, a UDP header where the source port number is 434 and the destination portion number is UP and an IP header where the destination IP address is the IP address CoA2 of the wireless LAN interface 420 of the terminal and the source IP address is the IP address HA of the home agent 500. The network stack 501 generates a Registration Reply message shown in FIG. 7.

The network stack 501 outputs the generated Registration Reply message to the network interface 510. The network interface 510 transmits the Registration Reply message, which is received from the network stack 501, to the wireless LAN interface 420.

(Step S1404) In the case that the home agent 500 accepts the request with the Registration Request message, the home agent 500 configures a new tunnel through the wireless LAN.

That is, the mobility protocol module 502 of the home agent 500 outputs a tuple of the IP address CoA2 of the wireless LAN interface 420 of the terminal 400 designated to the Care-of Address field of the Registration Request message, the IP address HA of the home agent designated to the Home Agent field, and the IP address HoA designated to the Home Address field as new tunnel configuration to the tunnel device module 503.

The tunnel device module 503 stores the new tunnel configuration, which is received from the mobility protocol module 502, in the storage unit 505.

Further, the home agent 500 may execute the new tunnel configuration before transmitting the Registration Reply message (Step S1403).

The home agent 500 holds the configuration of the tunnel that is used before Step S1404 and is needed to receive the packet from the cellular network interface 410 of the terminal 400, without deleting the configuration of the tunnel.

(Step S1405) The terminal 400 configures a new tunnel through the wireless LAN in accordance with reception of the Registration Reply message.

Specifically, the terminal 400 executes the following processes. First, the wireless LAN interface 420 outputs the received Registration Reply message to the network stack 401.

Since the transport protocol header of the Registration Reply message is UDP and the destination port number is UP, the network stack 401 detects that the destination of the Registration Reply message is the mobility protocol module 402, and outputs the Registration Reply message to the mobility protocol module 402.

Since the Code field of the Registration Reply message is 0, the mobility protocol module 402 detects that the home agent 500 accepts the request with the Registration Request message.

In addition, the mobility protocol module 402 outputs a tuple of the IP address CoA2 of the wireless LAN interface 420 and the IP address HA of the home agent 500 as new tunnel configuration to the tunnel device module 404.

The tunnel device module 404 stores the tunnel configuration, which is received from the mobility protocol module, in the storage unit 406.

Further, the terminal 400 holds the configuration of the tunnel that is used before Step S1405 and is needed to transmit and receive the packet from the cellular network interface 410, without deleting the configuration of the tunnel.

(Step S1406) A notification message is transmitted from the wireless LAN interface 420 of the terminal 400 through the wireless LAN to the home agent 500.

First, the mobility protocol module 402 of the terminal 400 notifies the tunnel device module 404 of the IP address CoA1 of the cellular network interface 410 and the IP address HA of the home agent 500.

The tunnel device module 404 acquires from the storage unit 406 a packet where the source IP address is CoA1 and the destination IP address is the IP address HA of the home agent 500.

As already described in Step S1400, every time the packet where the external IP header is added is output to the network stack 401, the tunnel device module 404 stores the contents of the packet in the storage unit 406, and deletes the packet that is previously stored and has the same source IP address and the same destination IP address.

That is, the newest tunneled packet is always stored in the storage unit 406.

Further, after Step S1405, when the terminal 400 transmits a packet to the counterpart apparatus 600 through the home agent 500, the terminal 400 does not use the cellular network interface 410 but uses the wireless LAN interface 420.

That is, the packet that is stored in the storage unit 406 in Step S1406 and has a source IP address as CoA1 is a finally tunneled packet that the terminal 400 transmits from the cellular network interface 410.

The tunnel device module 404 acquires from the storage unit 406 the finally tunneled packet that is transmitted from the cellular network interface 410, and outputs the packet to the mobility protocol module.

The mobility protocol module 402 generates data indicating a characteristic of the packet that is received from the tunnel device module 404, and outputs the data to the network stack 401.

The specific configuration of the data corresponds to a data portion of the notification message shown in FIG. 15. In an example shown in FIG. 15, the value of the checksum field in the IP header in the packet is set to the csum field of the data portion.

In addition to the checksum, the IP address CoA1 that is added to the cellular network interface 410 or the IP address HoA of the terminal 400 may be set to the data portion. Further, instead of the checksum, the packet itself may be set to the data portion of the notification message. Alternatively, data that specifies or almost specifies the packet may be set to the data portion.

Next, the network stack 401 adds a UDP header where the source port number is UP and the destination port number is 434 to the data that is received from the mobility protocol module 402.

Further, the network stack 401 adds an IP header where the source IP address is an IP address CoA2 of the wireless LAN interface 420 and the destination IP address is the IP address HA of the home agent 500, thereby generating a notification message shown in FIG. 15.

The network stack 401 outputs the notification message to the wireless LAN interface 420. The wireless LAN interface 420 transmits the received notification message to the home agent 500.

The notification message is received in the home agent 500 through the wireless LAN.

In general, the network delay in the wireless LAN is smaller than the network delay in the cellular network. For this reason, the notification message is arrived to the home agent 500 earlier than the finally tunneled packet that is transmitted through the cellular network.

If the network interface 510 of the home agent 500 receives the notification message, the network interface 510 outputs the notification message to the network stack 501.

Since the destination port number of the received notification message is 434, the network stack 501 detects that the destination of the notification message is the mobility protocol module 502, and outputs the contents of the notification message to the mobility protocol module 502.

The mobility protocol module 502 outputs the data portion described in the notification message as data indicating a characteristic to detect the target packet to the packet monitoring module 504. For example, in the case where the data (data indicating a characteristic to detect the target packet) is the value of the checksum field in the IP header of the finally tunneled packet that is transmitted from the terminal 400 through the cellular network, the mobility protocol module 502 outputs the value of the checksum field to the packet monitoring module 504.

The packet monitoring module 504 stores the value of the checksum field in the storage unit 505.

(Step S1407) The home agent 500 receives the tunneled packet from the wireless LAN interface 420 of the terminal 400 through the wireless LAN or receives the tunneled packet from the cellular network interface 410 of the terminal 400 through the cellular network. In this case, the home agent 500 transfers the packet where the external IP header of the received packet is deleted to the counterpart apparatus 600.

Further, the packet monitoring module 504 of the home agent acquires data indicating the characteristic to detect the target packet from the storage unit 505, and determines whether the packet received through the cellular network matches the data.

(Step S1408) If the packet monitoring module 504 determines that the packet received through the cellular network matches the data indicating the characteristic to detect the target packet acquired from the storage unit 505, the packet monitoring module 504 notifies the mobility protocol module 502 of the target packet being received.

As a result, the mobility protocol module 502 can detect that the finally tunneled packet is received through the cellular network used before the handover.

(Step S1409) The terminal 400 deletes the configuration of the tunnel that is used before the handover.

The mobility protocol module 402 of the terminal 400 notifies the tunnel device module 404 of the tuple of the IP address CoA1 allocated to the cellular network interface 410 and the IP address HA of the home agent 500.

In addition, the tunnel device module 404 deletes from the storage unit 406 the configuration of the tunnel that is indicated by the tuple of the IP addresses CoA1 and HA.

This process may be executed at arbitrary timing after the terminal 400 newly sets a tunnel through the wireless LAN (Step S1405).

(Step S1410) The home agent 500 deletes the configuration of the tunnel before the handover.

That is, the mobility protocol module 502 of the home agent 500 notifies the tunnel device module 503 of the tuple of the IP address CoA1 allocated to the cellular network interface 410 of the terminal 400, the IP address HoA of the terminal 400, and the IP address HA of the home agent 500.

In addition, the tunnel device module 503 deletes from the storage unit 505 the configuration of the tunnel that is indicated by the tuple of the IP addresses CoA1, HoA, and HA.

When the home agent 500 executes the process of Step S1410 and receives the packet shown in FIG. 4, since the configuration of the tunnel, which is matched with the source IP address and the destination IP address of the external IP header of the packet, does not exist in the storage unit 505, the tunnel device module 503 determines that the packet is an abnormal packet, and can discard the packet.

As such, according to the communication system in this embodiment, the notification message indicating the contents of the finally tunneled packet that the terminal transmits to the home agent through the network used before the handover is transmitted to the home agent by the terminal through the network used after the handover. When the home agent receives the packet which corresponds to the notification message through the tunnel used before the handover, the home agent can detect the point of time of deleting the tunnel used before the handover.

Further, since the terminal transmits the notification message through the network used after the handover, even though a packet loss may be generated on the network that is used by the terminal before the handover, the home agent can detect the point of time when the tunnel used before the handover can be deleted.

As such, since it is possible to quickly delete the tunnel that is used before the handover, memory resource can be effectively used.

In an example of the second embodiment, the home agent 500 may receive the packet where the destination IP address is HoA in Steps S1400, S1407, and S1408 to the home agent 500 and transmit the tunneled packet of the packet to the terminal 400.

In an example of the second embodiment, the terminal 400 and the home agent 500 may use a protocol having a sequence number field in a protocol header such as a GRE, ESP, or AH, instead of the IP-in-IP tunneling protocol, and may use the value of the sequence number field, instead the a value of a checksum field of an IP header.

Further, the home agent 500 may detect the point of time when all of the packets, each of which has the value of a sequence number field smaller than the value of the sequence number field of the first packet received through the tunnel used after the handover, are received as the point of time when the tunnel used before the handover can be deleted.

In this case, even though the transfer order of the packets is changed on the network used before the handover, the terminal 400 can detect the point of time when all of the packets that are transmitted from the terminal through the tunnel used by the home agent 500 before the handover can be received and the tunnel can be deleted.

Further, in an example of the second embodiment, the example where the Mobile IPv4 is used as a mobility protocol has been described, but the mobility protocol may be Mobile IPv6, MOBIKE, or any one of the other protocols.

Third Embodiment

Since a communication system according to a third embodiment of the present invention is the same as the communication system according to the second embodiment shown in FIG. 11, the description thereof will not be repeated.

Further, since the terminal 400 according to this embodiment has the same configuration as the terminal according to the second embodiment shown in FIG. 12, the description thereof will be omitted. However, the functions of the mobility protocol module 402 and the tunnel device module 404 are different from those of the second embodiment.

The mobility protocol module 402 generates and processes a message of the Mobile IPv4. The mobility protocol module 402 generates the Registration Request message and outputs it to the network stack 401. In addition, the mobility protocol module 402 receives the Registration Reply message from the network stack 401 and processes the Registration Reply message.

Further, the mobility protocol module 402 notifies the tunnel device module 404 of the direction to configure or delete the tunnel.

Further, the mobility protocol module 402 needs not to have a function to acquire from the tunnel device module 404 the contents of the final packet that the tunnel device module 404 generates using the configuration of the tunnel used before the handover, to generate a notification message indicating a characteristic of the packet, and to output the notification message to the network stack 401.

The tunnel device module 404 adds the external IP header according to the configuration of the tunnel, which is stored in the storage unit 406, to the packet received from the network stack 401, and outputs the packet to the network stack 401.

Further, the tunnel device module 404 stores the configuration of the tunnel, which is notified from the mobility protocol module 402, in the storage unit 406.

Further, the tunnel device module 404 deletes the configuration of the tunnel from the storage unit 406.

The tunnel device module 404 may not have the function to store contents of the final packet, to which an external IP header is added and which is output to the network stack 401, in the storage unit 406, the function to delete the contents of the packet that is matched with the source IP address and the destination IP address among the packets previously stored in the storage unit 406, and the function to output the contents of the packets stored in the storage unit 406 to the mobility protocol module 402.

Since the home agent 500 according to this embodiment has the same configuration as the home agent according to the second embodiment shown in FIG. 13, the description thereof will not be repeated. However, the functions of the mobility protocol module 502, the tunnel device module 503, and the packet monitoring module 504 are different from those of the second embodiment.

The mobility protocol module 502 generates and processes a message of Mobile IPv4. The mobility protocol module 502 receives the Registration Request message from the network stack 501 and processes the Registration Request message. Further, the mobility protocol module 502 generates a Registration Reply message and outputs the Registration Reply message to the network stack 501.

Further, the mobility protocol module 502 notifies the tunnel device module 503 of the direction to configure a new tunnel or delete the tunnel.

Further, the mobility protocol module 502 receives from the packet monitoring module 504 the sequence number in the tunneling protocol header of the first packet received from the terminal 400 through the network used after the handover.

Further, the mobility protocol module 502 outputs the value obtained by subtracting 1 from the sequence number and the IP address of the network interface used by the terminal 400 before the handover to the packet monitoring module 504.

Further, the mobility protocol module 502 may not have the function to receive the notification message from the network stack 501 and the function to notify the packet monitoring module 504 of the characteristic of the packet described in the notification message.

The tunnel device module 503 stores the configuration of the tunnel, which is received from the mobility protocol module 502, in the storage unit 505.

Further, when the tunnel device module 503 receives the direction to delete the configuration of the tunnel from the mobility protocol module 502, the tunnel device module 503 deletes the configuration of the tunnel from the storage unit 505.

Further, the tunnel device module 503 inspects whether the tunneled packet received from the network stack 501 is in accordance with the tunnel configuration stored in the storage unit. In addition, the tunnel device module 503 deletes the external IP header and the tunneling protocol header and outputs the packet to the network stack 501.

The packet monitoring module 504 stores the tuple of the protocol number and the IP address, which is transmitted from the mobility protocol module 502, in the storage unit 505.

Further, when the packet monitoring module 504 receives the notification of the deletion of the tuple from the mobility protocol module 502, the packet monitoring module 504 deletes the tuple from the storage unit 505.

Further, when the packet monitoring module 504 detects a packet that includes a transport protocol header corresponding to the protocol number of the tuple and has the source IP address matched with the IP address of the tuple, the packet monitoring module 504 notifies the mobility protocol module 502 of the detection.

Further, the packet monitoring module 504 outputs the sequence number, which is included in the tunneling protocol header of the packet first received from the terminal 400 through the network used by the home agent 500 after the handover, to the mobility protocol module 502.

Further, the packet monitoring module 504 stores the sequence number, which is received from the mobility protocol module 502, in the storage unit 505.

Further, the packet monitoring module 504 determines whether the sequence number included in the tunneling protocol header of the packet received from the network stack 501 is matched with the sequence number stored in the storage unit 505, notifies the mobility protocol module 502 of the matching when the sequence numbers are matched with each other, and outputs the packet to the network stack 501, after the determination.

Figure 16:
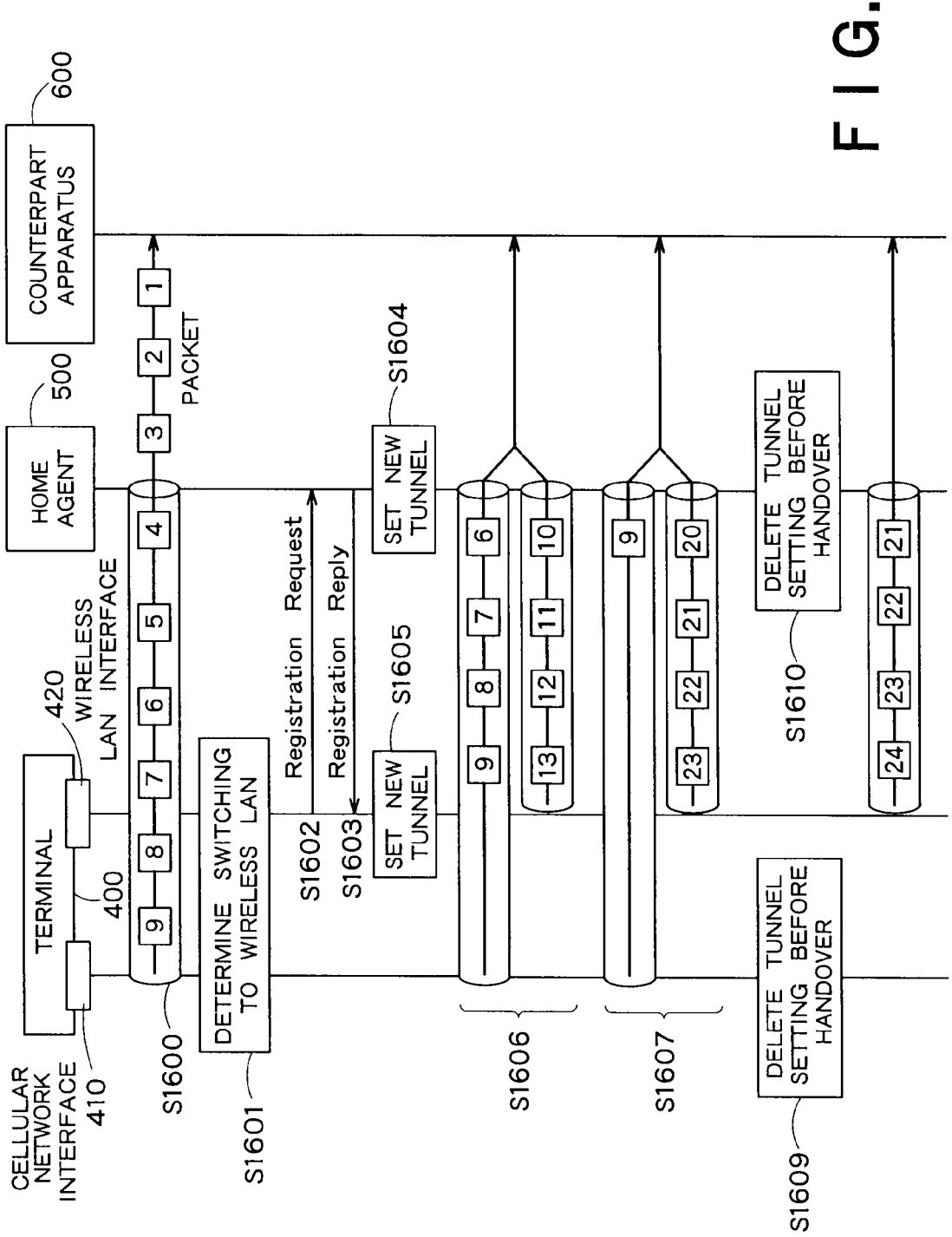
FIG. 16 is a diagram illustrating a process flow at the time of handover in the communication system according to a third embodiment.

The process flow at the time of handover in the communication system will be described using FIG. 16. In this embodiment, the case where the used network is switched from the cellular network to the wireless LAN will be described. Further, it is assumed that the terminal 400 and the home agent 500 uses a GRE (Generic Routing Encapsulation) as a tunneling protocol.

(Step S1600) The terminal 400 and the home agent 500 communicates each other by a tunnel through the cellular network, and the terminal 400 transmits the packet to the counterpart apparatus 600 through the home agent 500.

The terminal 400 executes the following processes. In this case, in the storage unit 406 of the terminal 400, a tuple of the IP address CoA1 allocated to the cellular network interface 410 and the IP address HA of the home agent 500 is stored as one tunnel configuration.

The application module 403 of the terminal 400 generates a data portion and outputs the data portion to the network stack 401.

The network stack 401 adds a transport header and an IP header to the data portion that is received from the application module 403 so as to generate a packet, and outputs the packet to the tunnel device module 404.

The tunnel device module 404 acquires from the storage unit 406 the tuple of the IP address CoA1 and the IP address HA as the tunnel configuration, adds an external IP header and a GRE header where a Protocol type field is 0800 in accordance with the acquired tunnel configuration, and generates a packet shown in FIG. 17.

However, in the sequence number field (not shown) of the GRE header, the value that is obtained by adding 1 to a value of the sequence number field of the GRE header of the immediately previously tunneled and transmitted packet to the home agent 500 is set.

If the value of the sequence number field of the immediately previously transmitted packet is 0xffffffff in hexadecimal, 1 is designated to the sequence number field of the GRE header.

In addition, the tunnel device module 404 outputs the packet to the network stack 401.

The network stack 401 outputs the tunneled packet, which is received from the tunnel device module 404, to the cellular network interface 410. The cellular network interface 410 transmits the packet, which is received from the network stack 401, to the home agent 500.

The home agent 500 that has received the packet transmitted from the terminal 400 executes the following processes. In this case, in the storage unit 505 of the home agent 500, a tuple of the IP address CoA1 allocated to the cellular network interface 410 of the terminal 400, the IP address HoA of the terminal 400, and the IP address HA of the home agent 500 is stored as one tunnel configuration.

If the network interface 510 of the home agent 500 receives a packet shown in FIG. 17 from the terminal 400, the network interface 510 outputs the received packet to the network stack 501.

The network stack 501 outputs the packet to the packet monitoring module 504.

The packet monitoring module 504 acquires data indicating a characteristic of the packet from the storage unit 505, and determines whether the packet corresponds to the acquired data. In Step S1600, since data indicating characteristics of packets is not stored in the storage unit 505, the packet monitoring module 504 determines that the packet does not correspond to the acquired data.

When it is determined that the packet does not correspond to the acquired data, the packet monitoring module 504 outputs the packet to the network stack 501. Further, a process of when it is determined that the packet corresponds to the acquired data will be described in Steps S1606 and S1607.

Since the packet that is received from the packet monitoring module 504 is the packet that is tunneled by the GRE protocol, the network stack 501 outputs the packet to the tunnel device module 503.

The tunnel device module 503 acquires the tunnel configuration including the IP address CoA1 from the storage unit 505. As described above, since the tuple of the IP address CoA1 and the IP address HoA is stored as the tunnel configuration in the storage unit 505, the tunnel device module 503 acquires the IP address HoA.

Next, the tunnel device module 503 compares the acquired IP address HoA with the source IP address in the IP header in the packet. As the comparison result, if the acquired IP address and the source IP address are matched with each other, the tunnel device module 503 deletes the GRE header and the external IP header of the packet and generates the packet shown in FIG. 5. In addition, the tunnel device module outputs the generated packet to the network stack 501.

Meanwhile, as the comparison result, when the acquired IP address and the source IP address are not matched with each other, the tunnel device module 503 discards the packet.

The network stack 501 that has received the packet from the tunnel device module 503 detects that the packet is a packet to be transferred to another apparatus because the destination IP address of the received packet is not the IP address HA allocated to the home agent 500, and outputs the packet to the network interface 510.

The network interface 510 transmits the received packet to the counterpart apparatus 600.

(Step S1601) The terminal 400 determines to switch the used network from the cellular network to the wireless LAN.

The handover trigger module 405 always acquires, from the cellular network interface 410 and/or the wireless LAN interface 420, information related to a communication quality in the cellular network or the wireless LAN.

In addition, if the information or the other information satisfies a predetermined condition, the handover trigger module 405 determines to start the handover, and notifies the mobility protocol module 402 of the determination.

(Step S1602) The wireless LAN interface 420 of the terminal 400 transmits the Registration Request message to the home agent. The process that is executed by the terminal 400 and the home agent 500 is the same as the process of Step S1402 in the second embodiment.

(Step S1603) The Registration Reply message is transmitted from the home agent 500 to the wireless LAN interface 420 of the terminal 400. The process that is executed by the terminal 400 and the home agent 500 is the same as the process of Step S1403 in the second embodiment.

(Step S1604) When the home agent 500 receives the contents of the Registration Request message, the home agent executes the same process as Step S1404 in the second embodiment, thereby configuring a new tunnel.

Further, the mobility protocol module 502 of the home agent 500 outputs a tuple of a protocol number 47 of the GRE and a source IP address CoA2 as data indicating a characteristic to detect the target packet as the packet monitoring module 504.

The packet monitoring module 504 stores the protocol number 47 of the GRE protocol and the source IP address CoA2 in the storage unit 505.

(Step S1605) The terminal 400 executes the same process as Step S1405 in the second embodiment thereby configuring a new tunnel.

(Step S1606) The terminal 400 transmits the packet to the counterpart apparatus 600 through the wireless LAN and the home agent 500.

The application module 403 of the terminal 400 generates the data portion and outputs the data portion to the network stack 401.

The network stack 401 adds a transport header and an IP header to the data portion that is received from the application module 403, and outputs the packet to the tunnel device module 404.

The tunnel device module 404 acquires from the storage unit 406 the tuple of the IP address CoA2 of the wireless LAN interface 420 and the IP address HA of the home agent 500 as the tunnel configuration.

In addition, the tunnel device module 404 adds an external IP header and a GRE header where a Protocol type field is 0800 to the packet received from the network stack 401 in accordance with the acquired tunnel configuration, and generates a packet shown in FIG. 18.

However, in a sequence number field of the GRE header, the value that is obtained by adding 1 to the value of the sequence number field in the GRE header of the immediately previously tunneled and transmitted packet to the home agent 500 is set.

When the value of the sequence number field of the immediately previously transmitted packet is 0xffffffff in hexadecimal, 1 is set to the sequence number field of the GRE header.

In addition, the tunnel device module 404 outputs the generated packet to the network stack 401.

The network stack 401 outputs the tunneled packet, which is received from the tunnel device module 404, to the wireless LAN interface 420. The wireless LAN interface 420 transmits the packet, which is received from the network stack 401, to the home agent 500.

If the home agent 500 receives the tunneled packet from the terminal 400 through the wireless LAN or the cellular network, the home agent 500 executes the following processes.

The network interface 510 of the home agent 500 outputs the received packet to the network stack 501.

The network stack 501 outputs the packet to the packet monitoring module 504.

If there is data indicating a characteristic of a detection object packet in the storage unit 505, the packet monitoring module 504 acquires the data. In Step S1604, since a tuple of a protocol number 47 of the GRE and a source IP address CoA2 as data is stored in the storage unit 505, the packet monitoring module 504 acquires the tuple.

The packet monitoring module 504 determines whether the packet corresponds to the acquired data.

When the packet is a packet that is received from the terminal 400 through the cellular network, the transport header is GRE, but the source IP address is CoA1. Therefore, the packet does not correspond to the acquired data. When the packet does not correspond to the acquired data, the packet monitoring module 504 outputs the packet to the network stack 501.

Meanwhile, when the packet is the tunneled packet that is first received from the wireless LAN interface 420 of the terminal 400 through the wireless LAN, the packet corresponds to the acquired data. When the packet corresponds to the acquired data, the packet monitoring module 504 notifies the mobility protocol module 502 of the sequence number included in the GRE protocol header of the corresponding packet, and outputs the packet to the network stack 501.

Since the packet that is received from the packet monitoring module 504 is the packet that is tunneled by the GRE protocol, the network stack 501 outputs the packet to the tunnel device module 503.

The tunnel device module 503 acquires tunnel configuration including the source IP address of the packet from the storage unit 505. As described above, since the tuple of the IP address CoA1 and the IP address HoA and the tuple of the IP address CoA2 and the IP address HoA are stored as the tunnel configuration in the storage unit 505, the tunnel device module 503 acquires the IP address HoA.

The tunnel device module compares the acquired IP address HoA with the source IP address of the IP header in the packet. As the comparison result, when the acquired IP address and the source IP address are matched with each other, the tunnel device module deletes the GRE header and the external IP header of the packet and generates the packet shown in FIG. 5. In addition, the tunnel device module outputs the generated packet to the network stack 501.

Meanwhile, as the comparison result, when the acquired IP address and the source IP address are not matched with each other, the tunnel device module 503 discards the packet.

The network stack 501 that has received the packet from the tunnel device module 503 detects that the packet is a packet to be transferred to another apparatus because the destination IP address of the received packet is not the IP address HA allocated to the home agent 500, and outputs the packet to the network interface 510.

The network interface 510 that has received the packet from the network stack 501 transmits the packet to the counterpart apparatus 600.

In general, the network delay in the wireless LAN is smaller than the network delay in the cellular network. Accordingly, the first tunneled packet that is received from the terminal 400 through the wireless LAN is arrived to the home agent 500 earlier than the finally tunneled packet that is received from the terminal 400 through the cellular network.

(Step S1607) If the mobility protocol 502 of the home agent 500 receives the sequence number in Step S1606, the home agent 500 executes the following processes, thereby starting a detection of the packet that is finally transmitted from the terminal 400 through the cellular network.

The mobility protocol module 502 of the home agent 500 outputs the tuple of the RGE protocol number 47 and the source IP address CoA2 to the packet monitoring module 504, and performs a notification so as to delete data indicating a characteristic of the packet that is stored in the storage unit 505 in Step S1604.

The packet monitoring module 504 deletes the tuple of the RGE protocol number 47 and the source IP address CoA2 from the storage unit 505.

The mobility protocol module 502 notifies the packet monitoring module 504 of a value obtained by subtracting 1 from the sequence number received from the packet monitoring module 504 in Step S1606 and the protocol number 47 of the GRE.

Further, when the value of the sequence number is 1, the mobility protocol module 502 notifies 0xffffffff in hexadecimal and the protocol number 47 of the GRE.

In addition, the packet monitoring module 504 stores the notified tuple of the sequence number and the protocol number 47 of the GRE as a characteristic to detect the target packet in the storage unit 505. In the following description, the packet monitoring module 504 sets the sequence number stored in the storage unit 505 as S. The sequence number S indicates a sequence number (final sequence number) of the final tunneled packet that is received from the terminal 400 through the cellular network.

(Step S1608) If the final tunneled packet is received from the terminal 400 through the cellular network, the home agent 500 executes the following processes.

The network interface 510 of the home agent 500 outputs the received packet to the network stack 501.

Next, the network stack 501 outputs the packet to the packet monitoring module 504.

Next, if there is data indicating a characteristic to detect the target packet in the storage unit 505, the packet monitoring module 504 acquires the data. In Step S1607, since the protocol number 47 of the GRE and the sequence number S as the data is stored in the storage unit 505. Accordingly, the packet monitoring module 504 acquires the tuple.

The packet monitoring module 504 determines whether the packet received from the network stack 501 corresponds to the tuple. Since the packet is the final packet tunneled from the terminal 400 through the cellular network, the packet corresponds to the tuple. The packet monitoring module 504 notifies the mobility protocol module 502 that the corresponding packet is detected.

In addition, the packet monitoring module 504 outputs the packet to the network stack 501.

Since the packet that is received from the packet monitoring module 504 is the packet that is tunneled by the GRE protocol, the network stack 501 outputs the packet to the tunnel device module 503.

The tunnel device module 503 acquires tunnel configuration including the source IP address CoA1 of the packet from the storage unit 505. As described above, since the tuple of the IP address CoA1 and the IP address HoA as the tunnel configuration is stored in the storage unit, the tunnel device module 503 acquires the IP address HoA.

The tunnel device module 503 compares the acquired IP address HoA with the source IP address of the internal IP header in the packet. As the comparison result, if the acquired IP address and the source IP address are matched with each other, the tunnel device module 503 deletes the GRE header and the external IP header of the packet and generates the packet shown in FIG. 5. In addition, the tunnel device module 503 outputs the generated packet to the network stack 501.

Meanwhile, as the comparison result, if the acquired IP address and the source IP address are not matched with each other, the tunnel device module 503 discards the packet.

The network stack 501 that has received the packet from the tunnel device module 503 detects that the packet is a packet to be transmitted to another apparatus because the destination IP address of the received packet is not the IP address allocated to the home agent 500, and outputs the packet to the network interface 510.

The network interface 510 transmits the packet, which is received from the network stack 501, to the communication counterpart apparatus 600.

In Step S1608, when the home agent 500 receives the tunneled packet through the wireless LAN, the sequence number S that is stored in the storage unit 505 is not matched with the sequence number that is included in the GRE protocol header of the packet.

Accordingly, except that the packet monitoring module 504 does not notify the mobility protocol module 502, the same process as the above process is executed.

By this process, the home agent 500 can detect the final tunneled packet that is received through the network used before the handover.

(Step S1609) The terminal 400 deletes the configuration of the tunnel that is used before the handover.

First, the mobility protocol module 402 of the terminal 400 notifies the tunnel device module 404 of the tuple of the IP address CoA1 allocated to the cellular network interface 410 and the IP address HA of the home agent 500.

In addition, the tunnel device module 404 deletes from the storage unit 406 the configuration of the tunnel that is indicated by the tuple of the IP addresses CoA1 and HA.

This process may be executed at arbitrary timing after new tunnel configuration (Step S1605).

(Step S1610) If the mobility protocol module 502 of the home agent 500 receives a notification from the packet monitoring module 504, the home agent 500 executes the following processes, thereby deleting the configuration of the tunnel that is used before the handover.

The mobility protocol module 502 of the home agent 500 outputs the tuple of the sequence number S and the protocol number 47 to the packet monitoring module 504, thereby notifying data indicating a characteristic of the packet that is stored in the storage unit 505 in Step S1607.

The packet monitoring module 504 deletes the tuple of the GRE protocol number 47 and the source IP address CoA2 from the storage unit 505.

In addition, the mobility protocol module 502 notifies the tunnel device module 504 of the tuple of the IP address CoA1 allocated to the cellular network interface 410 of the terminal 400, the IP address HoA of the terminal 400, and the IP address HA of the home agent 500.

Next, the tunnel device module 504 deletes from the storage unit 505 the configuration of the tunnel that is indicated by the tuple of the IP addresses CoA1, HoA, and HA.

By this process, when the home agent 500 receives the packet shown in FIG. 17, since the configuration of the tunnel, which is matched with the source IP address and the destination IP address of the external IP header of the packet, does not exist in the storage unit 505, the tunnel device module 503 determines that the packet is an abnormal packet, and can discard the packet.

As such, in this embodiment, the terminal 400 transmits the packet to the counterpart apparatus 600 through the home agent 500, on the basis of a tunneling protocol where a sequence number is described in a header for a tunnel. Further, from the contents of the first packet received from the terminal 400 through the network used after the handover, the home agent 500 predicts (estimates) a characteristic of the final packet, which is received through the network used before the handover. The home agent 500 detects the point of time when the received packet is matched with the predicted characteristic as the point of time when the tunnel used before the handover can be deleted.

Accordingly, the home agent 500 can delete the tunnel immediately at the point of time when all of the packets are received from the terminal through the tunnel that is used before the handover. As a result, it is possible to effectively use a memory resource.

Further, the terminal 400 and the home agent 500 according to this embodiment do not need to have a function to transmit and receive a special message that is not suitable for a specification of Mobile IPv4, and the home agent 500 can ensure connection with respect to the terminal 400.

Further, in the third embodiment, the tunnel device modules 404 and 503 of the terminal 400 and the home agent 500 may use a tunneling protocol such as ESP or AH where a sequence number can be described in a protocol header, instead of the GRE protocol.

Further, in the third embodiment, the point of time when all packets including sequence numbers in the predetermined range determined form the sequence number S stored in the storage unit 505 are received by the home agent 500 may be detected as the point of time when the tunnel used before the handover can be deleted.

In this case, even though the order of the packets is changed on the network used before the handover, the home agent 500 can detect the point of time when the tunnel used before the handover can be deleted. Further, the range does not need to be constant, and may be varied whenever the handover is performed.

Further, in the third embodiment, the example where the Mobile IPv4 is used as the mobility protocol has been described. However, the mobility protocol may be Mobile IPv6, MOBIKE, or any one of the other protocols. When the mobility protocol is not the Mobile IPv4, instead of Registration Reply and the Registration Request of the Mobile IPv4, the protocol is defined by a specification of Mobile IPv6 or MOBIKE and specifications of the other mobility protocols. The message that is needed for the handover is transmitted and received by the terminal and the home agent.

In the first to third embodiments, the cellular network interfaces 110 and 410 and the wireless LAN interfaces 120 and 420 may be interfaces supporting Ethernet, interfaces supporting 802.16 and 802.16e, and interfaces supporting Bluetooth or infrared communication.

In the first embodiment of the present invention, the terminal may have a plurality of network interfaces that are connected to different access networks instead of the cellular network interface 110 and the wireless LAN interface 120 and supporting the same protocol.

In the first to third embodiments, the terminals 100 and 400 may have two or more network interfaces, and the network used for communication with the counterpart apparatus may be changed, using the two network interfaces among the network interfaces in the terminal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A home agent that transmits and receives data with a mobile terminal, which performs handover between a first network and a second network, the home agent comprising:
 a network interface that transmits data to the mobile terminal and receives data from the mobile terminal, through the first network or the second network; and
 a mobility protocol module that receives a handover request message requesting to switch from the first network to the second network from the network interface, generates a first reply message describing acceptance of the switching transmitted through the second network, provides the first reply message to the network interface, starts packet transmission and reception using the second network, generates a reply request message transmitted through the first network, provides the reply request message to the network interface, acquires a second reply message in response to the reply request message from the network interface, and stops utilization of the first network,
 wherein the network interface transmits the first reply message to the mobile terminal, and
 the home agent discards a packet received through the first network after reception of the second reply message.

2. The home agent according to claim 1,
 wherein the mobility protocol module generates an ICMP Echo Request message as the reply request message.

3. A home agent that transmits and receives data with a mobile terminal, which performs handover between a first network and a second network, the home agent comprising:
 a network interface that transmits data to the mobile terminal and receives data from the mobile terminal, through the first network or the second network; and
 a mobility protocol module that receives a handover request message requesting to switch from the first network to the second network from the network interface, generates a reply message describing acceptance of the switching transmitted through the second network, provides the reply message to the network interface, starts packet transmission and reception using the second network, receives a message where a characteristic of a packet is described from the network interface, and stops utilization of the first network in accordance with reception of a packet suitable for the characteristic of the packet by the network interface,
 wherein the network interface transmits the reply message to the mobile terminal, and
 the home agent discards a packet received through the first network after reception of the packet suitable for the characteristic of the packet by the network interface.

4. The home agent according to claim 3,
 wherein the network interface receives the message where the characteristic of the packet is described through the second network.

5. The home agent according to claim 3, further comprising:
 a packet monitoring module that monitors whether the packet received by the network interface matches the characteristic of the packet, and transmits a notification of the received packet being matched the characteristic of the packet to the mobility protocol module in the case that the received packet matches the characteristic of the packet,
 wherein the mobility protocol module stops utilization of the first network on the basis of the notification.

6. The home agent according to claim 3,
 wherein the characteristic of the packet is a value in a checksum field in an IP header of a final packet that the network interface receives through the first network.

7. A home agent that transmits and receives data with a mobile terminal, which performs handover between a first network and a second network, the home agent comprising:
 a network interface that transmits data to the mobile terminal and receives a packet where a sequence number is described from the mobile terminal, through the first network or the second network;
 a packet monitoring module that compares the sequence number described in the packet received by the network interface with a final sequence number and transmits a notification when the sequence number and the final sequence number are matched with each other; and
 a mobility protocol module that receives a handover request message requesting to switch from the first network to the second network from the network interface, generates a reply message describing acceptance of the switching transmitted through the second network, provides the reply message to the network interface, starts packet transmission and reception using the second network, provides a value, which is obtained by subtracting 1 from a sequence number described in a packet that the network interface first receives through the second network, as the final sequence number to the packet monitoring module, and stops utilization of the first network on the basis of the notification from the packet monitoring module when the sequence number and the final sequence number are matched with each other, wherein the network interface transmits the reply message to the mobile terminal, and the home agent discards a packet received through the first network after reception of the packet with the final sequence number.

* * * * *